(12) United States Patent
Park et al.

(10) Patent No.: US 11,651,215 B2
(45) Date of Patent: May 16, 2023

(54) LANDMARK DETECTION USING CURVE FITTING FOR AUTONOMOUS DRIVING APPLICATIONS

(71) Applicant: NVIDIA Corporation, Santa Clara, CA (US)

(72) Inventors: Minwoo Park, Saratoga, CA (US); Yilin Yang, Santa Clara, CA (US); Xiaolin Lin, Sunnyvale, CA (US); Abhishek Bajpayee, Santa Clara, CA (US); Hae-Jong Seo, Campbell, CA (US); Eric Jonathan Yuan, Menlo Park, CA (US); Xudong Chen, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 300 days.

(21) Appl. No.: 17/109,421

(22) Filed: Dec. 2, 2020

(65) Prior Publication Data
US 2021/0166052 A1 Jun. 3, 2021

Related U.S. Application Data

(60) Provisional application No. 62/943,200, filed on Dec. 3, 2019.

(51) Int. Cl.
*G06N 3/08* (2023.01)
*G06V 20/58* (2022.01)
(Continued)

(52) U.S. Cl.
CPC ............. *G06N 3/08* (2013.01); *G05D 1/0088* (2013.01); *G06F 18/214* (2023.01); *G06F 18/23* (2023.01);
(Continued)

(58) Field of Classification Search
CPC ......... G05D 1/0088; G05D 2201/0213; G06K 9/6218; G06K 9/6221; G06K 9/6256;
(Continued)

(56) References Cited

U.S. PATENT DOCUMENTS 10,885,698 B2    1/2021  Muthler et al.
2010/0329513 A1* 12/2010 Klefenz ............... G06V 20/588
                                                              348/148
(Continued)

FOREIGN PATENT DOCUMENTS

EP    3 171 297 A1    5/2017

OTHER PUBLICATIONS

Qin Zou, "Robust Lane Detection From Continuous Driving Scenes Using Deep Neural Networks," Oct. 25, 2019, IEEE Transactions on Vehicular Technology, vol. 69, No. 1, Jan. 2020,pp. 41-49.*

(Continued)

*Primary Examiner* — Omar S Ismail
(74) *Attorney, Agent, or Firm* — Taylor English Duma L.L.P.

(57) ABSTRACT

In various examples, one or more deep neural networks (DNNs) are executed to regress on control points of a curve, and the control points may be used to perform a curve fitting operation—e.g., Bezier curve fitting—to identify landmark locations and geometries in an environment. The outputs of the DNN(s) may thus indicate the two-dimensional (2D) image-space and/or three-dimensional (3D) world-space control point locations, and post-processing techniques—such as clustering and temporal smoothing—may be executed to determine landmark locations and poses with precision and in real-time. As a result, reconstructed curves corresponding to the landmarks—e.g., lane line, road bound- (Continued)

ary line, crosswalk, pole, text, etc.—may be used by a vehicle to perform one or more operations for navigating an environment.

26 Claims, 19 Drawing Sheets

(51) Int. Cl.
```
G06V 20/56      (2022.01)
G06F 18/23      (2023.01)
G06F 18/214     (2023.01)
G06V 10/762     (2022.01)
G06V 10/764     (2022.01)
G06V 10/82      (2022.01)
G06V 10/44      (2022.01)
G06V 10/26      (2022.01)
G06V 10/46      (2022.01)
G05D 1/00       (2006.01)
G06N 3/045      (2023.01)
G06V 10/75      (2022.01)
G06V 10/774     (2022.01)
G06V 10/94      (2022.01)
```

(52) U.S. Cl.
CPC ............ *G06N 3/045* (2023.01); *G06V 10/26* (2022.01); *G06V 10/454* (2022.01); *G06V 10/46* (2022.01); *G06V 10/757* (2022.01); *G06V 10/763* (2022.01); *G06V 10/764* (2022.01); *G06V 10/774* (2022.01); *G06V 10/82* (2022.01); *G06V 10/955* (2022.01); *G06V 20/582* (2022.01); *G06V 20/588* (2022.01); *G05D 2201/0213* (2013.01); *G06V 10/471* (2022.01)

(58) Field of Classification Search
CPC ...... G06K 9/627; G06N 20/00; G06N 3/0454; G06N 3/08; G06V 10/26; G06V 10/44; G06V 10/454; G06V 10/46; G06V 10/471; G06V 10/757; G06V 10/763; G06V 10/764; G06V 10/774; G06V 10/82; G06V 10/955; G06V 20/582; G06V 20/588
See application file for complete search history.

(56) References Cited

U.S. PATENT DOCUMENTS

| | | | |
|---|---|---|---|
| 2013/0190981 A1* | 7/2013 | Dolinar | F16M 11/2014 348/148 |
| 2016/0209511 A1* | 7/2016 | Dolinar | F16M 11/2071 |
| 2016/0321074 A1 | 11/2016 | Hung et al. | |
| 2018/0121273 A1 | 5/2018 | Fortino et al. | |
| 2018/0129887 A1* | 5/2018 | Kang | G06T 7/70 |
| 2018/0189578 A1* | 7/2018 | Yang | G06V 10/34 |
| 2018/0370540 A1 | 12/2018 | Yousuf et al. | |
| 2019/0266418 A1 | 8/2019 | Xu et al. | |
| 2020/0250440 A1* | 8/2020 | Campos | G06V 10/752 |
| 2021/0080966 A1* | 3/2021 | Tran | B60W 30/18163 |
| 2021/0096264 A1* | 4/2021 | Bosse | G05D 1/0231 |
| 2021/0192231 A1* | 6/2021 | Lee | G06T 7/136 |

OTHER PUBLICATIONS

Ling Zheng, "Lane-Level Road Network Generation Techniques for Lane-Level Maps of Autonomous Vehicles: A Survey," Aug. 20, 2019, Sustainability 2019, 11(16), 4511; https://doi.org/10.3390/su11164511, pp. 1-9.*

John, V., et al., "Real-time road surface and semantic lane estimation using deep features", Signal, Image and Video Processing, vol. 12, No. 6, pp. 1133-1140 (Mar. 8, 2018).

Yang, Z., "Research on Lane Recognition Algorithm Based on Deep Learning", 2019 International Conference on Artificial Intelligence and Advanced Manufacturing, pp. 387-391 (2019).

International Search Report and Written Opinion received for PCT Patent Application No. PCT/US2020/062869, dated Mar. 17, 2021, 11 pages.

International Preliminary Report on Patentability for PCT Application No. PCT/US2020/062869, filed Dec. 2, 2020, dated Jun. 16, 2022, 9 pgs.

"Implementation of Control Flow in TensorFlow", TensorFlow Authors, TensorFlow design document, pp. 1-18 (2016).

"Taxonomy and Definitions for Terms Related to Driving Automation Systems for On-Road Motor Vehicles", SAE International, Standard No. J3016-201609, pp. 1-30, Sep. 30, 2016.

"Taxonomy and Definitions for Terms Related to Driving Automation Systems for On-Road Motor Vehicles", SAE International, Standard No. J3016-201806, pp. 1-35, Jun. 15, 2018.

Cheng, Guangliang et al., "Automatic Road Detection and Centerline Extraction via Cascaded End-to-End Convolutional Neural Network", IEEE Transactions on Geoscience and remote sensing, vol. 55, Issue 6, pp. 3322-3337 (Jun. 2017).

Kokkinos, Iasonas., "Pushing the Boundaries of Boundary Detection Using Deep Learning", Center for Visual Computing, pp. 1-12 (2015).

"tf.losses.get_regularization_loss", Retrieved from Internet URL : https://www.tensorflow.org/api_docs/python/tf/losses/get_regularization_loss, accessed on May 16, 2019, p. 1.

"tf.while_loop much slower than static graph?", tensorflow, Retrieved from Internet URL : https://github.com/tensorflow/tensorflow/issues/9527, accessed on May 16, 2019, pp. 7 (2017).

"tensorflow", GitHub, Retrieved from Internet URL : https://github.com/tensorflow/tensorflow/blob/master/tensorflow/core/kernels/hinge-loss.h, accessed on May 16, 2019, pp. 4 (2018).

"Methodology of Using a Single Controller (ECU) for a Fault-Tolerant/Fail-Operational Self-Driving System." U.S. Appl. No. 62/524,283, filed Jun. 23, 2017.

"Systems and Methods for Safe and Reliable Autonomous Vehicles", U.S. Appl. No. 62/584,549, filed Nov. 10, 2017.

"System and Method for Controlling Autonomous Vehicles", U.S. Appl. No. 62/614,466, filed Jan. 7, 2018.

"System and Method for Safe Operation of Autonomous Vehicles", U.S. Appl. No. 62/625,351, filed Feb. 2, 2018.

"Conservative control for zone driving of Autonomous Vehicles Using Safe Time of Arrival", U.S. Appl. No. 62/628,831, filed Feb. 9, 2018.

"Systems and method for Sharing Camera Data between primary and backup controllers in Autonomous Vehicle Systems", U.S. Appl. No. 62/629,822, filed Feb. 13, 2018.

"Pruning Convolutional Neural Networks for Autonomous Vehicles and Robotics", U.S. Appl. No. 62/630,445, filed Feb. 14, 2018.

"Methods for accurate real-time object detection and for determining confidence of object detection suitable for autonomous vehicles", U.S. Appl. No. 62/631,781, filed Feb. 18, 2018.

"System and Method for Autonomous Shuttles, Robo-Taxis, Ride-Sharing and On-Demand Vehicles", U.S. Appl. No. 62/635,503, filed Feb. 26, 2018.

"Convolutional Neural Networks to Detect Drivable Freespace for Autonomous Vehicles", U.S. Appl. No. 62/643,665, filed Mar. 15, 2018.

"Geometric Shadow Filter for Denoising Ray-Traced Shadows", U.S. Appl. No. 62/644,385, filed Mar. 17, 2018.

"Energy Based Reflection Filter for Denoising Ray-Traced Glossy Reflections", U.S. Appl. No. 62/644,386, filed Mar. 17, 2018.

"Distance Based Ambient Occlusion Filter for Denoising Ambient Occlusions", U.S. Appl. No. 62/644,601, filed Mar. 19, 2018.

"Adaptive Occlusion Sampling of Rectangular Area Lights with Voxel Cone Tracing", U.S. Appl. No. 62/644,806, filed Mar. 19, 2018.

(56) References Cited

OTHER PUBLICATIONS

"Deep Neural Network for Estimating Depth from Stereo Using Semi-Supervised Learning", U.S. Appl. No. 62/646,148, filed Mar. 21, 2018.
"Video Prediction Using Spatially Displaced Convolution", U.S. Appl. No. 62/646,309, filed Mar. 21, 2018.
"Video Prediction Using Spatially Displaced Convolution", U.S. Appl. No. 62/647,545, filed Mar. 23, 2018.
"System and Method for Training, Testing, Verifying, and Validating Autonomous and Semi-Autonomous Vehicles", U.S. Appl. No. 62/648,399, filed Mar. 27, 2018.
"Method and System of Remote Operation of a Vehicle Using an Immersive Virtual Reality Environment", U.S. Appl. No. 62/648,493, filed Mar. 27, 2018.
"System and Methods for Virtualized Intrusion Detection and Prevent System in Autonomous Vehicles", U.S. Appl. No. 62/682,803, filed Jun. 8, 2018.
"Deep Learning for Path Detection in Autonomous Vehicles", U.S. Appl. No. 62/684,328, filed Jun. 13, 2018.
"System and Methods for Advanced AI-Assisted Vehicles", U.S. Appl. No. 62/648,358, filed Mar. 26, 2018.

\* cited by examiner

LANDMARK DETECTION USING CURVE FITTING FOR AUTONOMOUS DRIVING APPLICATIONS

CROSS-REFERENCE TO RELATED APPLICATIONS

This application claims the benefit of U.S. Provisional Application No. 62/943,200, filed on Dec. 3, 2019, which is hereby incorporated by reference in its entirety.

This application is related to U.S. Non-Provisional patent application Ser. No. 16/514,230, filed on Jul. 17, 2019, which is hereby incorporated by reference in its entirety.

BACKGROUND

The ability to accurately and precisely detect landmarks—e.g., lane lines, lane edges, road boundaries, text, poles or signs, and/or other features—in an environment is imperative for autonomous machine applications at all levels of autonomy—e.g., from driver/pilot assisted machines or vehicles to semi-autonomous and fully-autonomous machines and vehicles. Due to the variation in road marking quality, geographical or regional differences in lane and road marking conventions, as well as road marking obstructions, degradation, and/or occlusion due to wear and tear, weather conditions, lighting conditions, temporary markings (e.g., due to construction or disaster relief), and/or the like, the diversity of lane markings that can be encountered in the environment during driving is very high.

Some conventional approaches to lane or line detection have used deep neural network (DNN) processing, where high-resolution images of driving surfaces and associated annotations of lanes and lines are used to train the DNN (e.g., a convolutional neural network (CNN)) to recognize lane lines. These conventional approaches have trained the DNN to generate a segmentation mask showing a general position of lane lines in an image by classifying each pixel of the image as either part of a lane line, or not. However, these conventional approaches require extensive post-processing—such as dynamic programming—to convert the output to a usable representation of lane lines, road boundaries, poles, and/or other features. For example, because the outputs of these conventional DNNs include identification of each of the pixels that belong to each landmark feature, correlations between each of the pixels that belong to a same landmark as well as classifications thereof must be determined during post-processing. In addition, for landmarks that have other than a straight profile—e.g., to follow curves or contours of a driving surface—additional angular or directional information must be output by the DNN and post-processed to determine angles or directions of the landmark features. These extensive post-processing tasks increase the latency of the system, as well as increase the compute requirements of the system, thus making these conventional DNNs less useful for real-time deployment in a vehicle.

SUMMARY

Embodiments of the present disclosure relate to landmark detection using curve fitting for autonomous driving applications. Systems and methods are disclosed that use one or more deep neural networks (DNNs) to regress on control points of a curve and use the control points to perform a curve fitting operation—e.g., Bezier curve fitting—to identify landmark locations and geometries in an environment. The outputs of the DNN(s) may thus indicate the two-dimensional (2D) image-space and/or three-dimensional (3D) world-space control point locations, and less compute and time intensive post-processing techniques—such as clustering and temporal smoothing—may be executed to determine landmark locations and poses with precision and in real-time. As a result, and in contrast to conventional systems, the control points may be regressed similarly to an object detection approach, and the control points may then be used to reconstruct the curve corresponding to the landmark—e.g., lane line, road boundary line, crosswalk, pole, text, etc.—for each of the landmarks in a field of view of each of one or more sensors of a vehicle.

To train the DNN(s) for accurate prediction, ground truth data corresponding to control point locations for landmark features may be generated from polyline and/or polygon annotations corresponding to landmark features in training data sets. For example, because training data sets may include previously annotated polylines or polygons, these existing annotations—in addition to or alternatively from new or additional training data sets—may be analyzed using a curve fitting approach to determine control points for use in generating ground truth data. In some embodiments, to increase the accuracy of control point determinations, points from the ground truth polylines may be resampled to create more evenly spaced points along the polylines such that the determined control points more accurately reflect the curve of the landmark feature. The ground truth data used to train the DNN(s) to regress on control points may include a binary mask indicating pixels within a threshold distance to a curve, distance regression channels indicating distances—in an x, y, and/or z direction (for 3D control point regression)—to control points, and/or classification channels for determining classification or semantic information corresponding to each control point or fitted curve. Once trained and deployed, the DNN(s) may accurately and precisely compute outputs indicating control point locations and semantic information corresponding thereto, and these outputs may be decoded and post-processed to determine curves corresponding to landmark features.

BRIEF DESCRIPTION OF THE DRAWINGS

The present systems and methods for landmark detection using curve fitting for autonomous driving applications are described in detail below with reference to the attached drawing figures, wherein.

DETAILED DESCRIPTION

Systems and methods are disclosed related to landmark detection using curve fitting for autonomous driving applications. Although the present disclosure may be described with respect to an example autonomous vehicle 1100 (alternatively referred to herein as "vehicle 1100" or "autonomous vehicle 1100," an example of which is described herein with respect to FIGS. 11A-11D), this is not intended to be limiting. For example, the systems and methods described herein may be used by non-autonomous vehicles, semi-autonomous vehicles (e.g., in adaptive driver assistance systems (ADAS)), robots, warehouse vehicles, off-road vehicles, flying vessels, boats, a passenger vehicle, a car, a truck, a bus, a first responder vehicle, a shuttle, an electric or motorized bicycle, a motorcycle, a fire truck, a police vehicle, an ambulance, a construction vehicle, an underwater craft, a drone, another type of vehicle (e.g., that is unmanned and/or that accommodates one or more passengers), a piloted or un-piloted robot, and/or a piloted or un-piloted robotic platform. In addition, although the present disclosure may be described with respect to autonomous driving, this is not intended to be limiting. For example, the systems and methods described herein may be used in robotics, aerial systems, boating systems, and/or other technology areas, such as for perception, world model management, path planning, obstacle avoidance, and/or other processes.

Figure 1:
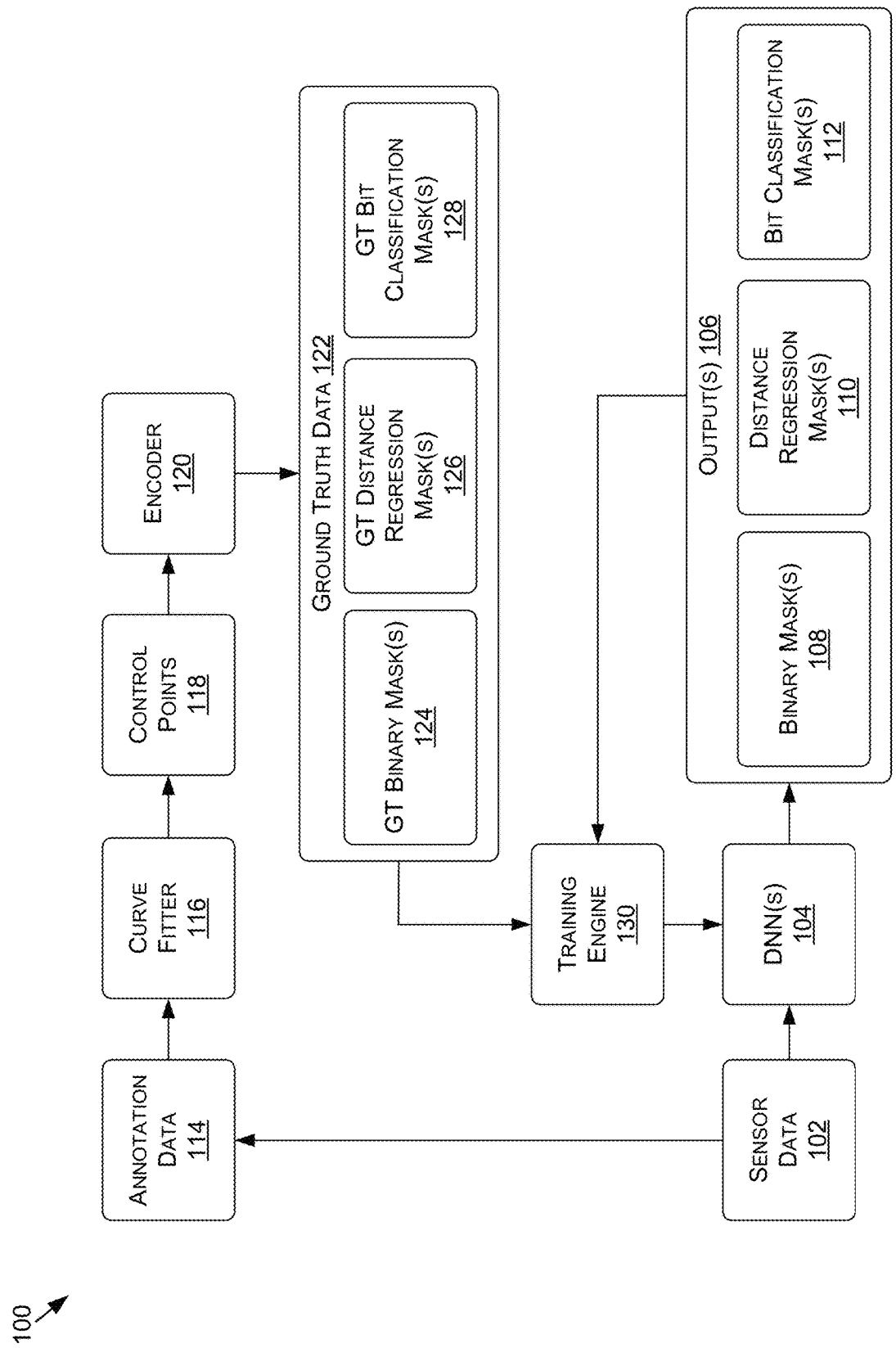
FIG. 1 is a data flow diagram illustrating an example process for training a deep neural network (DNN) for landmark detection, in accordance with some embodiments of the present disclosure.

With reference to FIG. 1, FIG. 1 is a data flow diagram illustrating an example process for training a deep neural network (DNN) for landmark detection, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, training of a deep neural network (DNN) 104 according to the process 100 may be implemented, at least in part, using similar components, features, and/or functionality as described herein with respect to vehicle 1100 of FIGS. 11A-11D, example computing device 1200 of FIG. 12, and/or example data center 1300 of FIG. 13.

The process 100 may include generating and/or receiving sensor data 102 from one or more sensors. The sensor data 102 may be received, as a non-limiting example, from one or more sensors of a vehicle (e.g., vehicle 1100 of FIGS. 11A-11D as described herein). The sensor data 102 may be used by the vehicle 1100, and within the process 100, to train one or more DNN(s) 104 to detect landmarks—e.g., landmark location, poses, semantic classes, etc. During training, the sensor data 102 may be generated using one or more data collection vehicles that generate sensor data for training DNNs, such as the DNN(s) 104, and/or may be pre-generated and included in a training data set. The sensor data 102 used during training may additionally or alternatively be generated using simulated sensor data (e.g., sensor data generated using one or more virtual sensors of a virtual vehicle in a virtual environment) and/or augmented sensor data (e.g., sensor data generated using one or more data collection vehicles and modified with virtual data, respectively). Once trained and deployed in the vehicle 1100, the sensor data 102 may be generated by one or more sensors of the vehicle 1100 and processed by the DNN(s) 104 to compute various outputs 106, as described herein.

Figure 11A:
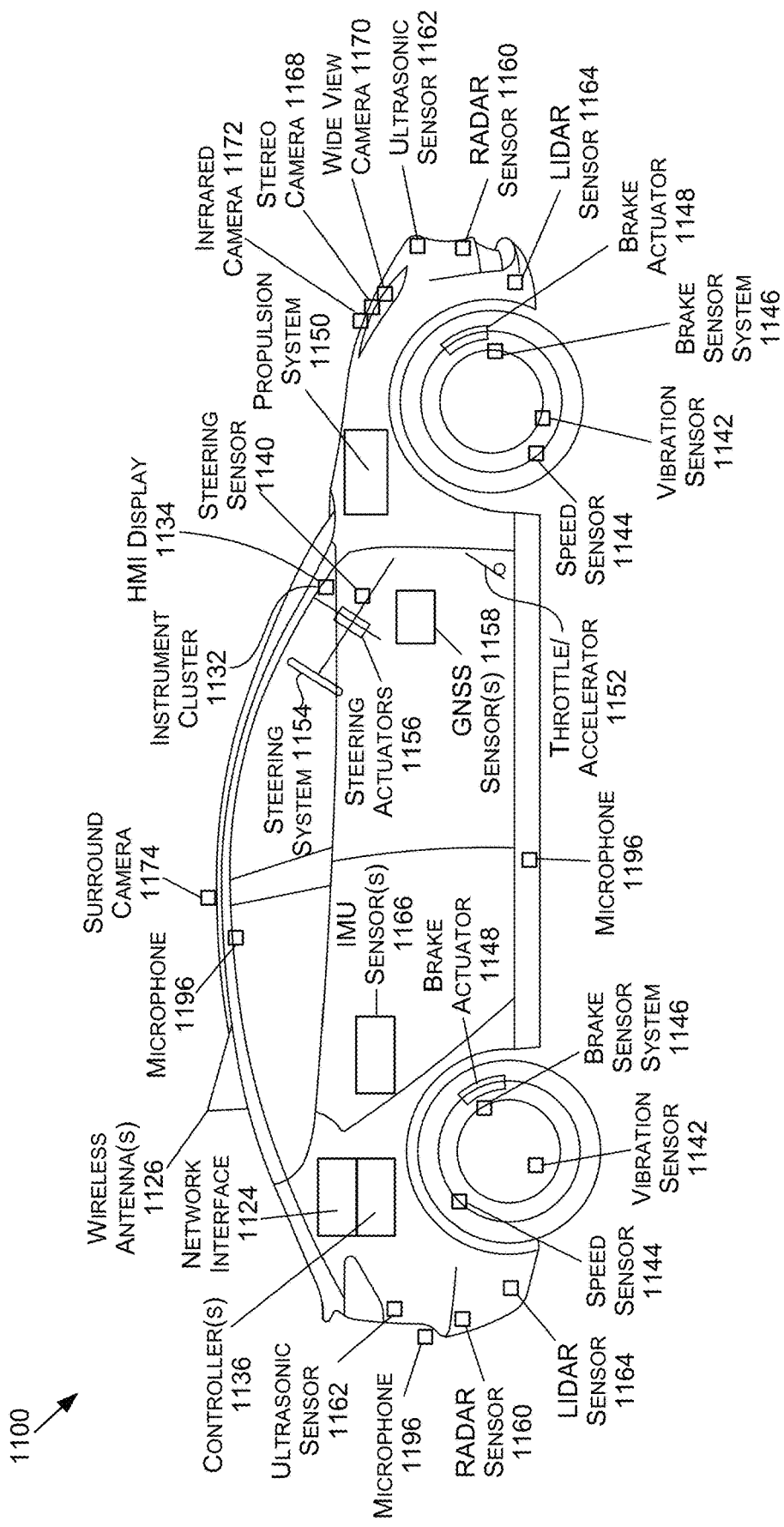
FIG. 11A is an illustration of an example autonomous vehicle, in accordance with some embodiments of the present disclosure.
Figure 11B:
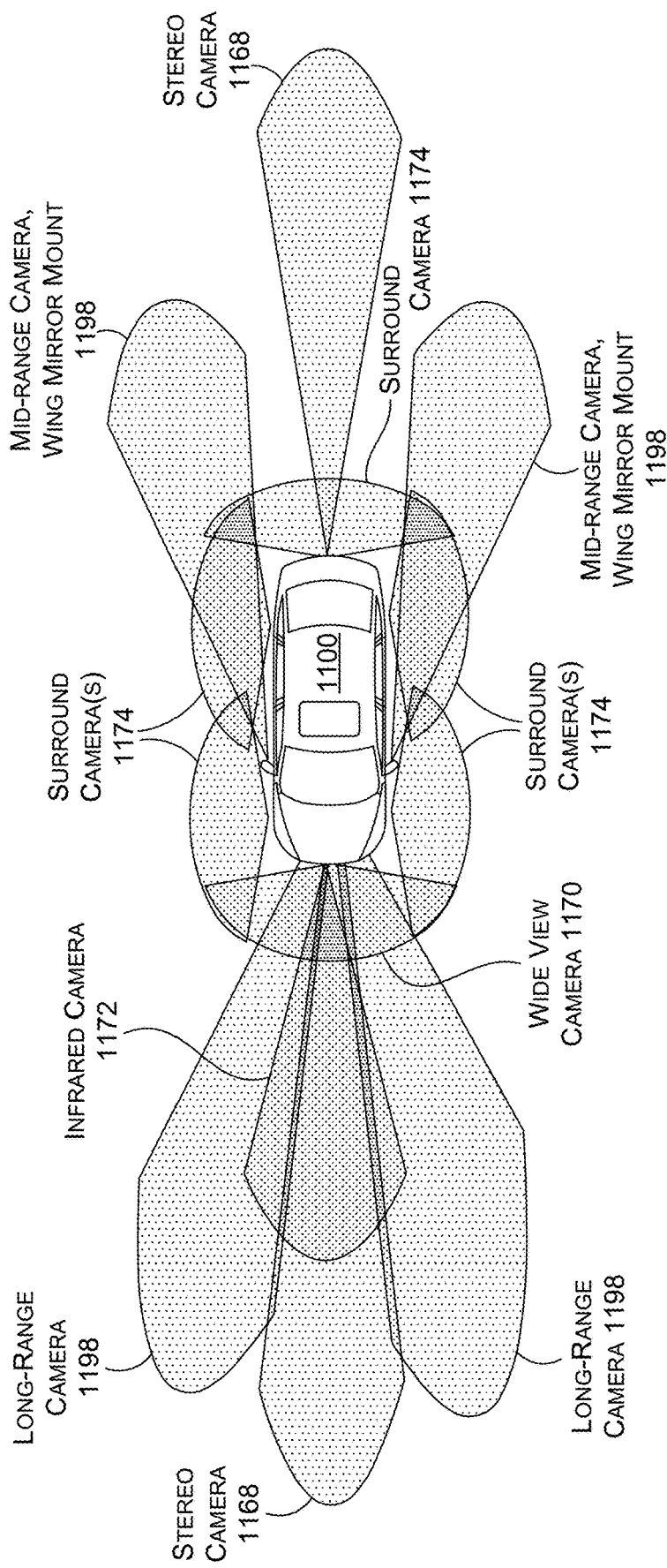
FIG. 11B is an example of camera locations and fields of view for the example autonomous vehicle of FIG. 11A, in accordance with some embodiments of the present disclosure.
Figure 11C:
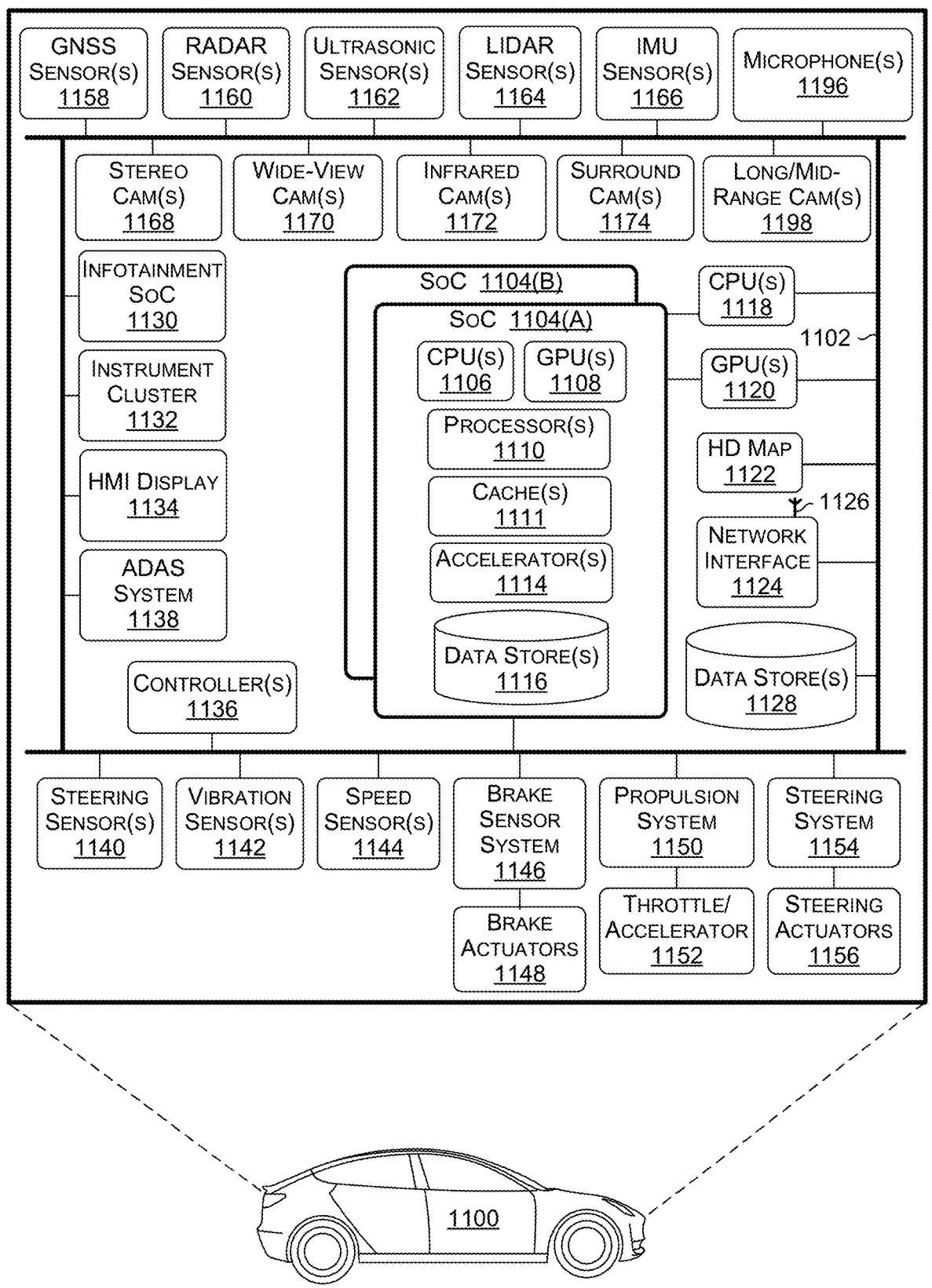
FIG. 11C is a block diagram of an example system architecture for the example autonomous vehicle of FIG. 11A, in accordance with some embodiments of the present disclosure.

As such, the sensor data 102 may include, without limitation, sensor data 102 from any of the sensors of the vehicle 1100 including, for example and with reference to FIGS. 11A-11C, RADAR sensor(s) 1160, ultrasonic sensor(s) 1162, LIDAR sensor(s) 1164, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1178, and/or other sensor types. As another example, the sensor data 102 may include virtual (e.g., simulated or augmented) sensor data generated from any number of sensors of a virtual vehicle or other virtual object in a virtual (e.g., testing) environment. In such an example, the virtual sensors may correspond to a virtual vehicle or other virtual object in a simulated environment (e.g., used for testing, training, and/or validating DNN performance), and the virtual sensor data may represent sensor data captured by the virtual sensors within the simulated or virtual environment. As such, by using the virtual sensor data, the DNN(s) 104 described herein may be tested, trained, and/or validated using simulated or augmented data in a simulated environment, which may allow for testing more extreme scenarios outside of a real-world environment where such tests may be less safe.

In some embodiments, the sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

Figure 2A:
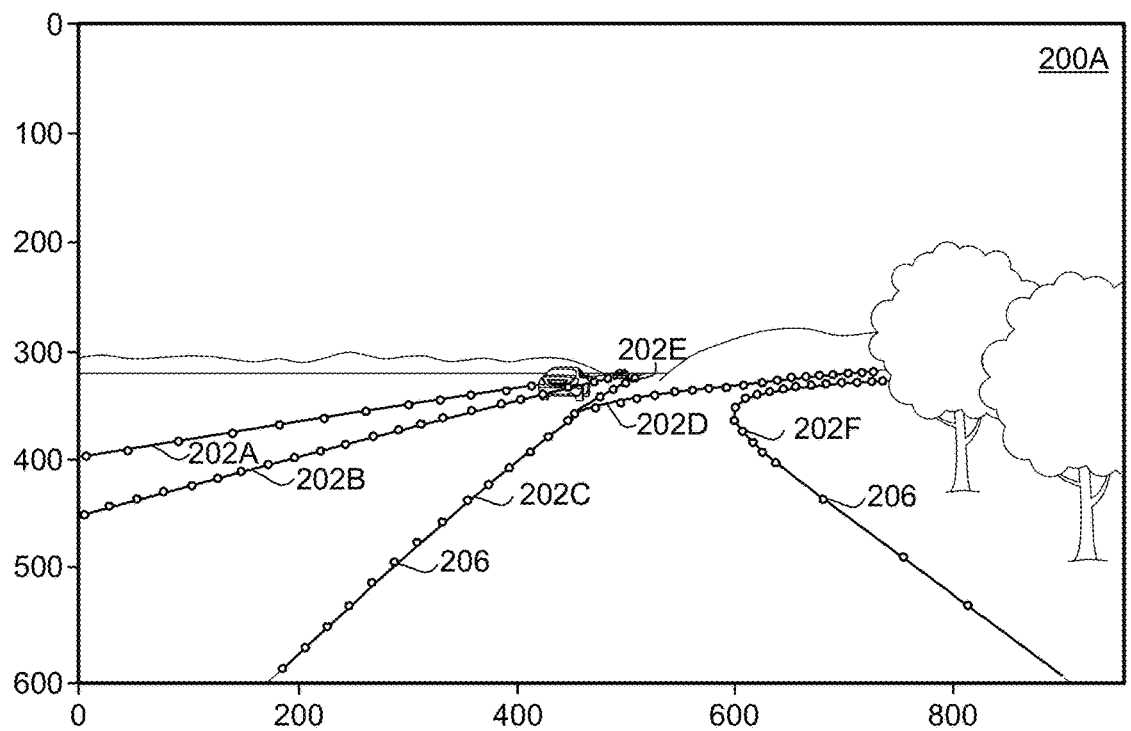
FIG. 2A depicts a visualization of annotations associated with a training image, in accordance with some embodiments of the present disclosure.

The sensor data 102 used for training may include original images (e.g., as captured by one or more image sensors), down-sampled images, up-sampled images, cropped or region of interest (ROI) images, otherwise augmented images, and/or a combination thereof. The DNN(s) 104 may be trained using the images (and/or other sensor data 102) as well as corresponding ground truth data 122—e.g., ground truth (GT) binary mask(s) 124, GT distance regression mask(s) 126, and/or GT bit classification mask(s) 128. The ground truth data 122 may be generated by an encoder 120 using annotation data 114—e.g., annotations, labels, masks, and/or the like—a curve fitter 116, and/or control points 118. For example, in some embodiments, the annotation data 114 may represent polylines corresponding to any landmark type, such as road markings, lane lines, road boundary lines, intersection lines, pedestrian walkways, bike lane lines, text, poles, trees, light posts, signs, etc. For example, with respect to FIG. 2A, visualization 200A may include polylines 202A-202F, which may correspond to lane lanes and/or road boundary lines. The polylines 202A-202F may include corresponding semantic or classification information. For example, when annotating the polylines 202, the polylines 202 may be associated with a particular semantic class(es). For example, polyline 202A may correspond to a road boundary line, or more granularly a solid white road boundary line. Similarly, polyline 202C may correspond to a dashed lane line and polyline 202D may correspond to a solid road boundary line.

In some embodiments, the polylines may be determined or extracted from polygons. For example, the annotations or labels represented by the annotation data 114 may correspond to polygons substantially defining the shapes of the landmarks—e.g., polygons fit to each lane, polygons fit to poles, polygons fit to text, etc. A center line, left boundary line, and/or right boundary line of the polygons may be used to generate polylines. For example, for a lane, a polygon may be used to determine a left lane line (e.g., a left edge of the polygon), a right lane line e.g., a right edge of the polygon), and/or a center line or rail of the lane (e.g., a line extending through a center of the polygon). As such, where polygons are used, the polylines—such as the polylines 202 of FIG. 2A—may be generated or extracted from the polygons. In any embodiments, the annotations may include polygons, polyline, another annotation or label type, or a combination thereof.

As described herein, the annotation data 114 may represent semantic or classification information corresponding to the polygons, polylines, and/or other annotation or label types. The semantic classes may include any level of granularity. For example, the semantic classes may include lane lines, road boundary lines, intersection lines, poles, signs, texts, etc. At a more granular level, the semantic classes for lane lines, for example, may include solid or dashed lines, yellow or white lines, single or double lines, or a combination thereof. As such, for non-limiting examples, the semantic classes for lane lines may include white single solid, yellow single solid, white single dashed, yellow single dashed, white double solid, yellow double solid, white double dashed, yellow double dashed, white solid dashed, yellow solid dashed, white dashed solid, yellow dashed solid, triple solid, triple dashed, solid dashed solid, dashed solid dashed, and so on. For the road boundary, the semantic classes may include, for non-limiting examples, barriers, curbs, seams, lines, and so on. For intersection lines, the semantic classes may include, for non-limiting examples, intersection lines, crossing lines, stop lines, pedestrian lines, and so on. For poles, the semantic classes may include, for non-limiting examples, road signs, poles, lights, utility poles, trees, and so on, or for signs may include traffic signs, construction signs, advertising signs, and so on. As such, any number and granularity of semantic classes may be associated with the annotations or labels, and used to generate the ground truth data 122 for training the DNN(s) 104.

The annotations may be generated within a drawing program (e.g., an annotation program), a computer aided design (CAD) program, a labeling program, another type of program suitable for generating the annotations, and/or may be hand drawn, in some examples. In any example, annotation data 114 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies center or origin point and dimensions of areas, machine generates polygons and/or labels for intersection areas).

The process 100 may include executing a curve fitting operation using a curve fitter 116. For example, the polylines represented by the annotation data 114 may undergo a curve fitting operation to determine control points that define points of a curve. As such, the ground truth data 122 may be used to train the DNN(s) 104 to predict, regress on, or otherwise compute the locations—in 2D image space or 3D world space—of the control points. The curve fitting operation may include a 2D Bezier curve fitting algorithm (e.g., for image space control point estimation), a 3D Bezier curve fitting algorithm (e.g., for world space control point estimation), a cubic Bezier curve fitting algorithm (e.g., including four control points for each curve), a higher order Bezier curve fitting algorithm (e.g., five or more control points), or a split wise Bezier curve fitting algorithm (e.g., single curve split into two or more curves, each including a plurality of control points), and/or another curve fitting algorithm type. In some embodiments, the curve fitting algorithm may be used to determine three or more control points in order to increase the precision and accuracy of curve fitting. For example, with only two points, the result of curve fitting is similar to that of linear interpolation which would yield less accurate or precise results for curves that are not linear. As such, the more control points used, the more accurate or precise the curve fitting may be, while the more control points the more processing and compute intensive the operation, thereby increasing runtime of the system. Thus, through experimentation, and as a non-limiting example, using three to five control points may result in accurate and precise results with an acceptable compute requirement that allows for real-time deployment. However, any number of control points may be used without departing from the scope of the present disclosure. In addition, although the illustrations herein include four control points per curve, this is not intended to be limiting and is for example purposes only. Further, although Bezier curve fitting is primarily described herein, this is not intended to be limiting, and other curve fitting algorithms may be used without departing from the scope of the present disclosure. However, Bezier curve fitting includes several advantages including the use of three or more control points to generate more accurate curve fitting results and two of the control points are located the beginning and end of each curve which is useful for the vehicle 1100 in making planning, control, or other decision types.

In some embodiments, prior to the curve fitting operation, the points along the polylines from the annotation data may be resampled. For example, because the polylines may include less points where curves are straighter and more points where there is more curvature, there may be more points at some locations than at others. While polylines without resampling may yield accurate results, the accuracy may be increased by resampling the points along the polylines to include a more evenly sampled distribution of points. As an example, polyline 202F of FIG. 2A may include points 206 prior to resampling, while polyline 202C may include points 206 after resampling. As illustrated, the points 206 along the polyline 202C are more evenly distributed than the points along the polyline 202F. By resampling, the curve fitting operation may be less likely to generate control points that favor regions of the polylines that have a higher number of points. As a result, the control points determined using the curve fitter 116, and thus the ground truth data 122 generated using the control points, may be more precise for curve fitting.

Figure 2B:
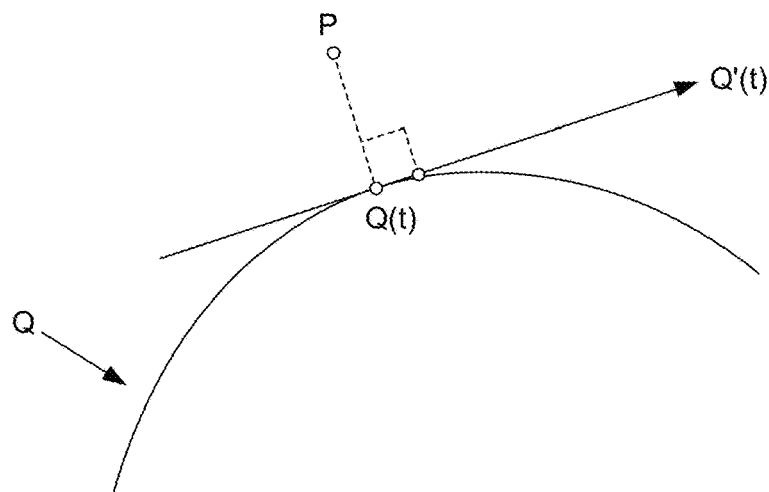
FIG. 2B depicts a curve fitting operation, in accordance with some embodiments of the present disclosure.

The polylines—after resampling, in embodiments—may then undergo the curve fitting operation to determine the control point locations. With reference to FIG. 2B, and as an example where Bezier curve fitting is used, the Bezier curve may be defined as Q(t), where t may include a parameter such that 0<t<1. The first matrix, T, in the matrix expression of equation (1), below, consists of $t^0$, $t^1$, $t^2$, and $t^3$. In equation (1), the second matrix, M, may be referred to as a Bezier matrix, which consists of coefficients when we expand the cubic polynomial. The four control points (in this example cubic Bezier curve fitting algorithm) include $P_0$, $P_1$, $P_2$, and $P_3$ and, since there are two dimensions in this example, the control points may be expressed as the third matrix, P, in equation (1), where $x_0$ and $y_0$ represent (x, y) coordinates (e.g., pixel coordinates in 2D image space) for control point $P_0$, and so on. Although represented as 2D pixel or image space coordinates, this is not intended to be limiting, and in some embodiments the coordinates may correspond to 3D world space coordinates such that the DNN(s) 104 is trained to directly compute 3D coordinates for the control points of the curves.

$$Q(t) = (1-t)^3 P_3 + 3(1-t)^2 t P_2 + 3(1-t)t^2 P_1 + t^3 P_0 = \begin{bmatrix} t^3 \\ t^2 \\ t \\ 1 \end{bmatrix}^T \begin{bmatrix} t^3 & -1 & -3 & 1 \\ t^2 & 3 & 3 & 0 \\ t & -3 & 0 & 0 \\ 1 & 1 & 0 & 0 \end{bmatrix} \begin{bmatrix} x_0 & y_0 \\ x_1 & y_1 \\ x_2 & y_2 \\ x_3 & y_3 \end{bmatrix} \quad (1)$$

The Bezier curve fitting algorithm may optimize P and T alternatively. An initial T can be computed by the length of each line segment (or polyline). If there is only one line segment, the line segment may be split equally into three line segments. If there are only two line segments, the longer one may be split equally into two line segments. Any line segment may be split into small pieces so that each line segment has relatively the same length, in embodiments. The initial T may be computed after the line segments have been determined, and then the resampled polyline may be used for optimization. When T is fixed, P can be solved by a least squares method, such as, for example, according to equation (2), below:

$$P = (M^T T^T T M)^{-1} M^T T^T Q \quad (2)$$

When P is fixed, T can be solved by a Newton-Raphson method. For example, the problem to solve may be the root of equation (3), below:

$$f(t) = (Q(t) - Q) Q'(t) \quad (3)$$

The concept is illustrated, as an example, in FIG. 2B, where the foot of f(t), f'(t), is computed according to equation (4), below:

$$f'(t) = Q'(t) Q'(t) + (Q(t) - Q) Q''(t) \quad (4)$$

where the update step is represented by equation (5), below:

$$t = t - f(t)/f'(t) \quad (5)$$

At each iteration, an error, e, may be computed according to equation (6), below:

$$e = \|P - TMQ\| \quad (6)$$

If the error, e, stops decreasing, convergence may be determined. If the error, e, goes beyond a max error, divergence may be determined. If a max number of steps or iterations is reached, the result of the last iteration may be used.

Figure 2C:
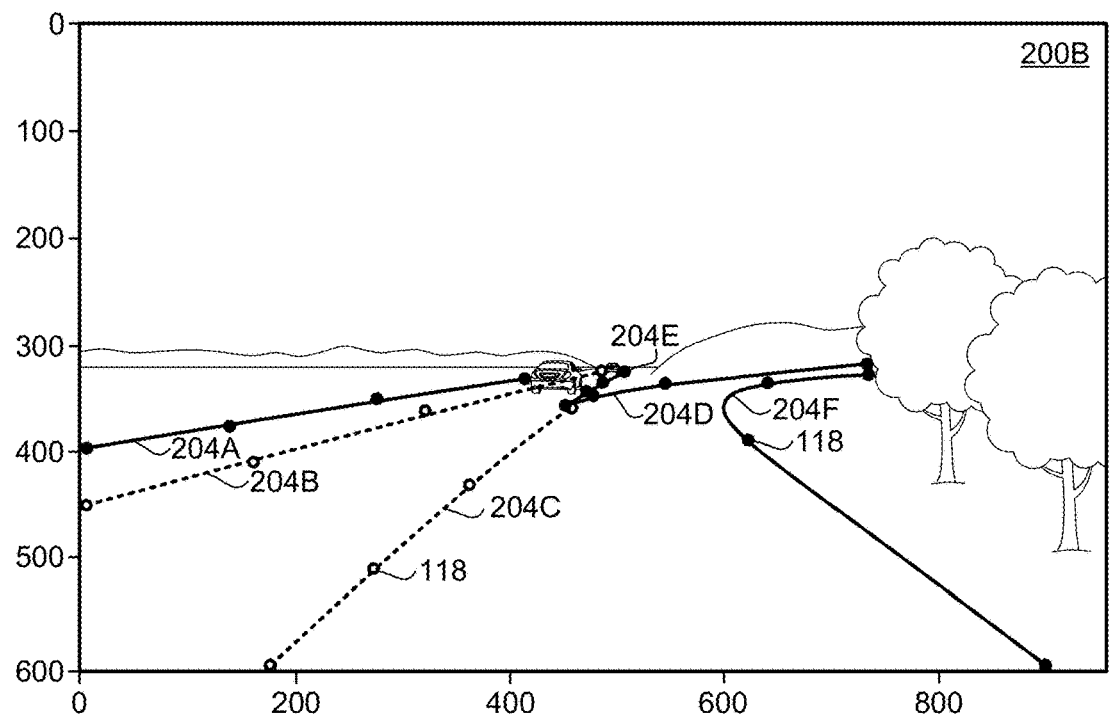
FIG. 2C depicts a visualization of annotations converted to curves using a curve fitting operation, in accordance with some embodiments of the present disclosure.

As a result of the curve fitting operation by the curve fitter 116, one or more curves may be generated each defined by control points 118. As an example of the result of the curve fitting operation, FIG. 2C includes a visualization 200B of curves 204 (e.g., curves 204A-204F) generated from the polylines 202 of FIG. 2A after curve fitting. As such, each curve (of a particular semantic label) includes an equal number of control points 118—e.g., four in this example, such as where cubic Bezier curve fitting was executed. As illustrated, even though contiguous in world space, because the curve 204C corresponds to a lane line and curve 204E corresponds to a road boundary line, two curves 204 may be generated each with respective control points 118. As a result, as described herein, the DNN(s) 104 may be trained to compute a bit classification masks(s) 112 corresponding to particular semantic classes, and/or to regress on (or otherwise compute) a binary mask(s) 108 and distance regression mask(s) 110 that correspond to control points 118 of a curve 204 for a particular landmark type (e.g., a particular road marking type with respect to FIG. 2C).

The control points 118 and/or the semantic classification information may then be used by an encoder 120 to generate the ground truth data 122 for training the DNN(s) 104 using a training engine 130. As such, for each instance of the sensor data 102 in the training data set, ground truth data 122 may be generated. The ground truth data 122 may include one or more GT binary masks 124, one or more GT distance regression masks 126, and/or one or more GT bit classification masks 128. In some embodiments, such as where variable lengths and/or widths are used for encoding curves in the ground truth data 122—as described in more detail herein—a weight channel may also be generated for the ground truth data 122. Ultimately, the ground truth data 122 may be compared to the outputs 106 of the DNN(s) 104 by the training engine 130 using one or more loss functions—such as but not limited to those described herein. For example, the binary mask(s) 108 computed by the DNN(s) 104 for an instance of the sensor data 102 may be compared to the GT binary mask(s) 124 corresponding the same instance of the sensor data 102, the distance regression mask(s) 110 computed by the DNN(s) 104 for an instance of the sensor data 102 may be compared to the GT distance regression mask(s) 126 corresponding the same instance of the sensor data 102, and so on. The training engine 130 may use the loss function(s) to determine updates to parameters (e.g., weights, biases, etc.) of the DNN(s) 104, and this process may be repeated until the DNN(s) 104 converges to an acceptable level of accuracy—e.g., until the trained parameters of the DNN(s) 104 converge to optimum, desired, and/or acceptable values.

Figure 3A:
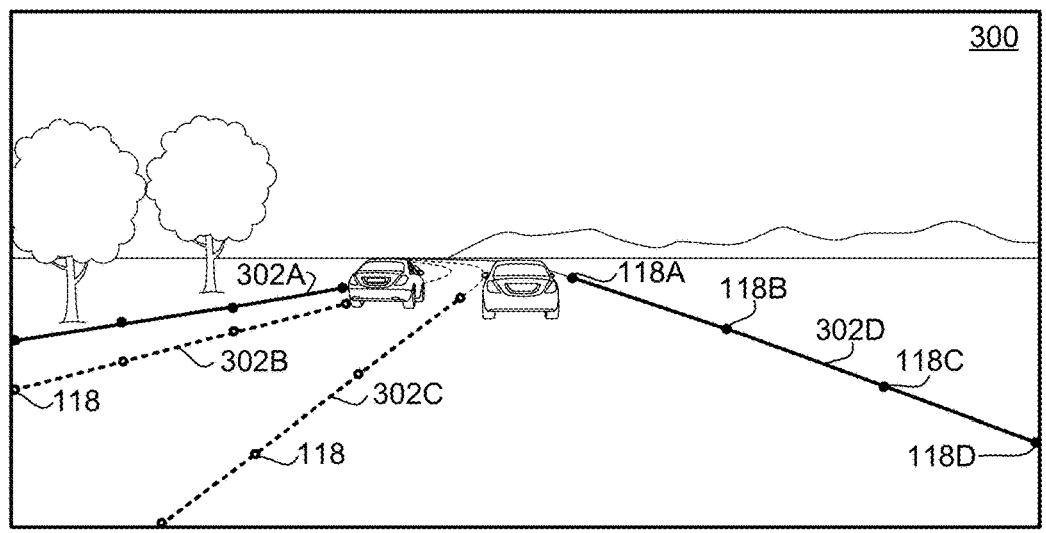
FIG. 3A depicts a visualization of training data for use in generating ground truth data, in accordance with some embodiments of the present disclosure.

As an example, and with reference to FIG. 3A, visualization 300 may correspond to an instance of the sensor data 102 (e.g., an image) and corresponding curves 302A-302D each including control points 118 (e.g., each curve 302 may include four control points 118). Each curve 302 may have been generated by the curve fitter 116 from polylines represented by the annotation data 114. The curves 302 may each be associated with semantic classification information. For example, the curves 302A and 302D may correspond to road boundary lines and the curves 302B and 302C may correspond to lane lines (e.g., lane edge lines). As illustrated with respect to curve 302D only (for clarity purposes), each curve 302 may include a first control point 118A, a second control point 118B, a third control point 118C, and a fourth control point 118D. The first control point 118A may correspond to an end control point and the fourth control point 118D may correspond to a beginning control point 118 for each curve.

Figure 3B:
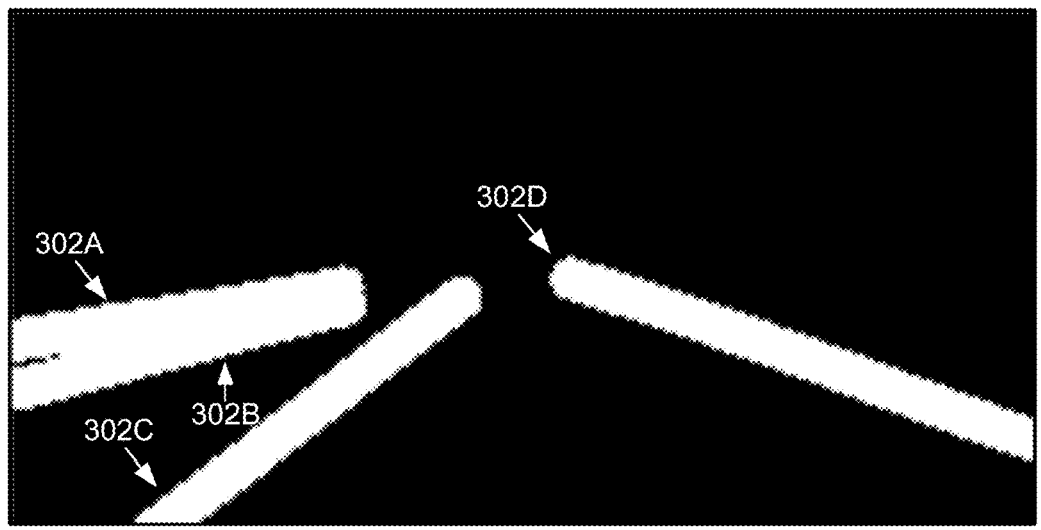
FIG. 3B depicts a visualization of a binary mask, in accordance with some embodiments of the present disclosure.

The encoder 120 may use the curves 302 to encode the GT binary mask(s) 124. For example, with respect to FIG. 3B, a GT binary mask 124A corresponding to the curves 302 from the visualization 300 is illustrated. The GT binary mask 124A may be generated by encoding a first value (e.g., 1) to each pixel within a predefined radius of any curve 302, while a second value (e.g., 0) to each pixel outside of the predefined radius of any curve 302. The radius may be selected to be any value. For example, in a non-limiting example, where the input and output resolution of the DNN(s) 104 differ (e.g., due to down-sampling through convolutional operations), the radius may be between 2 to 6 pixels at the output resolution of the DNN(s) 104, which may include 16 to 48 pixels (e.g., where the difference in resolution is 8x) at the input resolution of the DNN(s) 104 (e.g., the resolution of the image from the visualization 300). However, a different radius may be set depending on the embodiment and/or a difference in input versus output resolution may be set depending on the embodiment. For example, because the pixels encoded as being within a radius may be used during decoding as candidate pixels for regressing on (or otherwise computing) the control points 118, a radius may be determined such that enough candidate pixels are selected for accurate and precise predictions while not including so many pixels that processing requirements and runtime are increased.

Figure 3C:
FIG. 3C depicts a visualization of a bit classification mask, in accordance with some embodiments of the present disclosure.
Figure 3D:
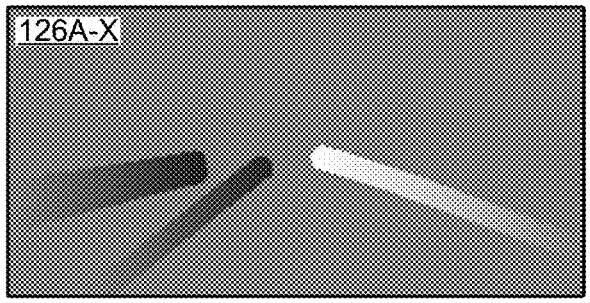
FIGS. 3D-3K depict visualizations of distance regression masks, in accordance with some embodiments of the present disclosure.
Figure 3E:
Figure 3F:
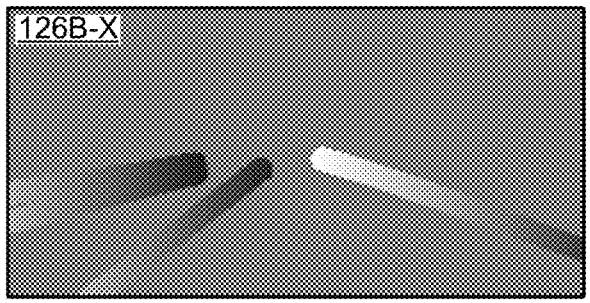
Figure 3G:
Figure 3H:
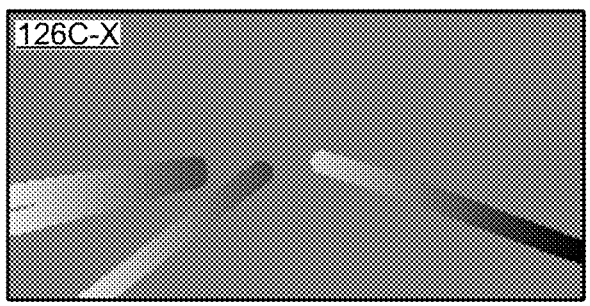
Figure 3I:
Figure 3J:
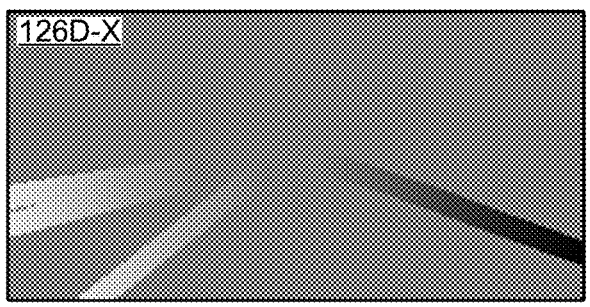

The encoder 120 may use the control points 118 of the curves 302 to encode the GT bit classification mask(s) 128. For example, a number of GT bit classification mask(s) 128 or channels may be determined based on the number of different semantic classes the DNN(s) 104 is trained to predict. For example, if there are n semantic classes, there may be a ceiling (maximum) of log $2(n)$ channels. As such, if there is only a single semantic class, there may be no bit classification channels, and thus no GT bit classification masks 128. However, where there are two bit classification channels, there may be a single bit classification channel and thus a single GT bit classification masks 128. In such an example, a first value (e.g., 0) may indicate a pixel corresponds to a first semantic class and a second value (e.g., 1) may indicate a pixel corresponds to a second semantic class. As an example, and with respect to FIG. 3C, GT bit classification mask 128A may correspond to the visualization 300, where there are two semantic classes (e.g., assuming the DNN(s) 104 in such an example is only trained to predict for two classes). For example, the curves 302C and 302B corresponding to the lane lines may be encoded with a first value (e.g., 1, corresponding to white) and the curves 302A and 302D corresponding to the road boundary lines may be encoded with a second value (e.g., 0, corresponding to black). In some embodiments, each of the pixels of the GT distance regression mask 126 may be encoded (or considered for encoding) with a bit classification value, while in other examples, only the pixels identified as being within the radius of a curve 302 from the GT binary mask(s) 124 may be encoded with bit classification values. Where the radius is used for each mask type, the DNN(s) 104 may be trained to make predictions for the pixels that are most likely to contribute to the accuracy of the prediction, while not training on background pixels.

The encoder 120 may use the control points 118 of the curves 302 to encode the GT distance regression mask(s) 126. For example, for each control point 118, an x-axis GT distance regression mask 126 and a y-axis GT distance regression mask 126 may be encoded. In embodiments where the control points 118 are in 3D world space coordinates, each control point 118 may include an additional z-axis GT distance regression mask 126. For example, each curve 302 may include a first control point 118 (e.g., an end control point), the pixels of the x-axis GT distance regression masks 126 may be encoded with a distance (e.g., a pixel distance) in the x-direction to a nearest first control point 118A of any of the curves 302, and the pixels of the y-axis GT distance regression masks 126 may be encoded with a distance (e.g., a pixel distance) in the y-direction to a nearest first control point 118A of any of the curves 302. This process may be repeated for each of the control points 118B-118D (where there are four control points 118, but may include more or less iterations where there are more or less control points 118). The values for distances may have a scaling factor applied thereto to generate updated distance values that are within a smaller range of values (e.g., closer to 0-1 than 0-90, or some other values). In some embodiments, each of the pixels of the GT distance regression mask 126 may be encoded, while in other examples, only the pixels identified as being within the radius of a curve 302 from the GT binary mask(s) 124 may be encoded with distance values. In examples where only the pixels within the radius are used, the accuracy may not suffer while processing requirements and runtime may be reduced.

Figure 3K:
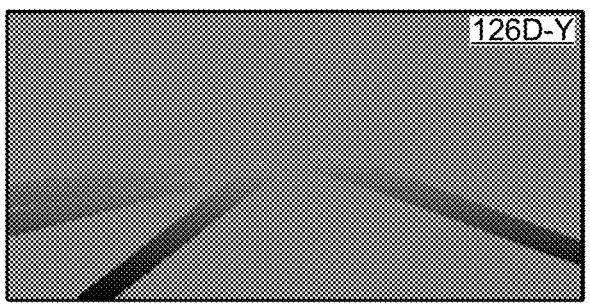

As an example, and with respect to FIGS. 3D-3K, the control points 118A for each curve 302A-302D may be encoded to an x-axis GT distance regression mask 126A-X (FIG. 3D) and a y-axis GT distance regression mask 126A-Y (FIG. 3E), the control points 118B for each curve 302A-302D may be encoded to an x-axis GT distance regression mask 126B-X (FIG. 3F) and a y-axis GT distance regression mask 126B-Y (FIG. 3G), the control points 118C for each curve 302A-302D may be encoded to an x-axis GT distance regression mask 126C-X (FIG. 3H) and a y-axis GT distance regression mask 126C-Y (FIG. 3I), and the control points 118D for each curve 302A-302D may be encoded to an x-axis GT distance regression mask 126D-X (FIG. 3J) and a y-axis GT distance regression mask 126D-Y (FIG. 3K).

In some embodiments, the distances may correspond to the output resolution of the DNN(s) 104, while in other embodiments, the distances may correspond to the input resolution of the DNN(s) 104. As such, even though an x-axis or y-axis distance may be computed for a pixel at the output resolution, the value may correspond to the distance (e.g., pixel distance) at the input resolution (e.g., of an input image to the DNN(s) 104). As such, during decoding, the pixel at the output resolution may have a known or estimated corresponding pixel(s) at the input resolution, and the known or estimated corresponding pixel(s) may then have the value from the output resolution attributed thereto. This process may be similar to FIGS. 2A-2B and the accompanying description in U.S. Non-Provisional patent application Ser. No. 16/514,230, filed on Jul. 17, 2019, which is hereby incorporated by reference herein in its entirety.

Figure 4A:
FIGS. 4A-4C depict visualizations of ground truth data generated using reduced lengths and varied weighting, in accordance with some embodiments of the present disclosure.
Figure 4B:
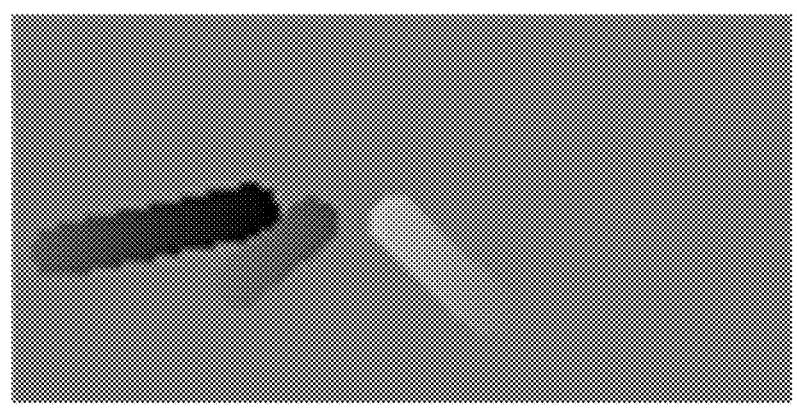
Figure 4C:

In some embodiments, such as where two or more of the GT binary mask(s) 124, the GT distance regression masks 126, or the GT bit classification mask(s) 128 are generated such that only pixels within a radius of a curve 302 are encoded, the radius may differ for different mask types. For example, the GT binary mask 124 may have a first radius and the GT distance regression masks(s) 126 may have a second radius different from the first radius. Similarly, the GT bit classification mask(s) 128 may have a different radius than the GT binary mask 124 and/or the GT distance regression masks(s) 126. In such embodiments, another GT weight channel or mask may be generated to train the DNN(s) 104 to output the weight channel to aid in decoding the masks even where their radius (e.g., pixel radius from a curve) may differ. For example, with respect to FIGS. 4A-4C, a GT binary mask 124B (FIG. 4A) may include a first radius, a GT distance regression mask 126E (FIG. 4B) may include a second, larger radius, and a weight channel or mask 400 (FIG. 4C) may be used to encode this information such that a computed weight channel of the DNN(s) 104 during deployment may be used by a decoder 120 (FIG. 6) to more accurately regress on (or otherwise compute) locations of the control points 118.

In some embodiments, to make predictions of the DNN(s) 104 more concentrated, the ground truth data 122 may be encoded with a shorter length for the curves. For example, each of the GT binary mask(s) 124, the GT distance regression mask(s) 126, and/or the GT bit classification mask(s) 128 may be encoded with a shorter distance—as illustrated by the difference between the masks of FIGS. 3B-3K and the masks of FIGS. 4A-4C. For example, in some embodiments, the encoded values for the curves in each of the masks may be cropped at a top and/or a bottom by some percentage or amount. In a non-limiting embodiments, the values corresponding to a top 25% of a curve and the values corresponding to a bottom or lower 25% of a curve may be cropped such that the resulting masks from the ground truth data 122 are 50% of their potential or original length were the entire curve to be encoded. These values are for example purposes only, and one or more key performance indicators (KPIs) may be used to determine suitable or ideal values for any particular embodiment. This process may be helpful because the process accounts for the receptive field of the DNN(s) 104. For example, if the full curve or polyline is used, then the pixels or points (e.g., in 3D world space) on each end of the curves or polylines may have as accurate of a regression channel output.

As such, once the ground truth data 122 has been encoded, the DNN(s) 104 may undergo training using the training engine 130. The sensor data 102 may be applied to the DNN(s) 104, and the DNN(s) 104 may compute the outputs 106. The outputs 106 may then be compared to the corresponding ground truth data 122 using one or more loss functions, and the outputs of the loss function(s) may be used by the training engine 130 to update parameters of the DNN(s) 104. This process may be repeated until acceptable convergence has been achieved.

The loss functions may, in some embodiments, be different for different ground truth data 122 types. For example, a first loss function may be used to train the DNN(s) 104 with respect to the GT binary mask(s) 124 and the binary mask(s) 108, a second loss function may be used to train the DNN(s) 104 with respect to the GT distance regression mask(s) 126 and the distance regression masks(s) 110, and a third loss function may be used to train the DNN(s) 104 with respect to the GT bit classification mask(s) 128 and the bit classification mask(s) 112. As a non-limiting example, the binary mask channels may be trained using binary cross entropy loss, the distance regression channels may be trained using masked L1 loss, and the bit classification channels may be trained using masked binary cross entropy loss.

Figure 5:
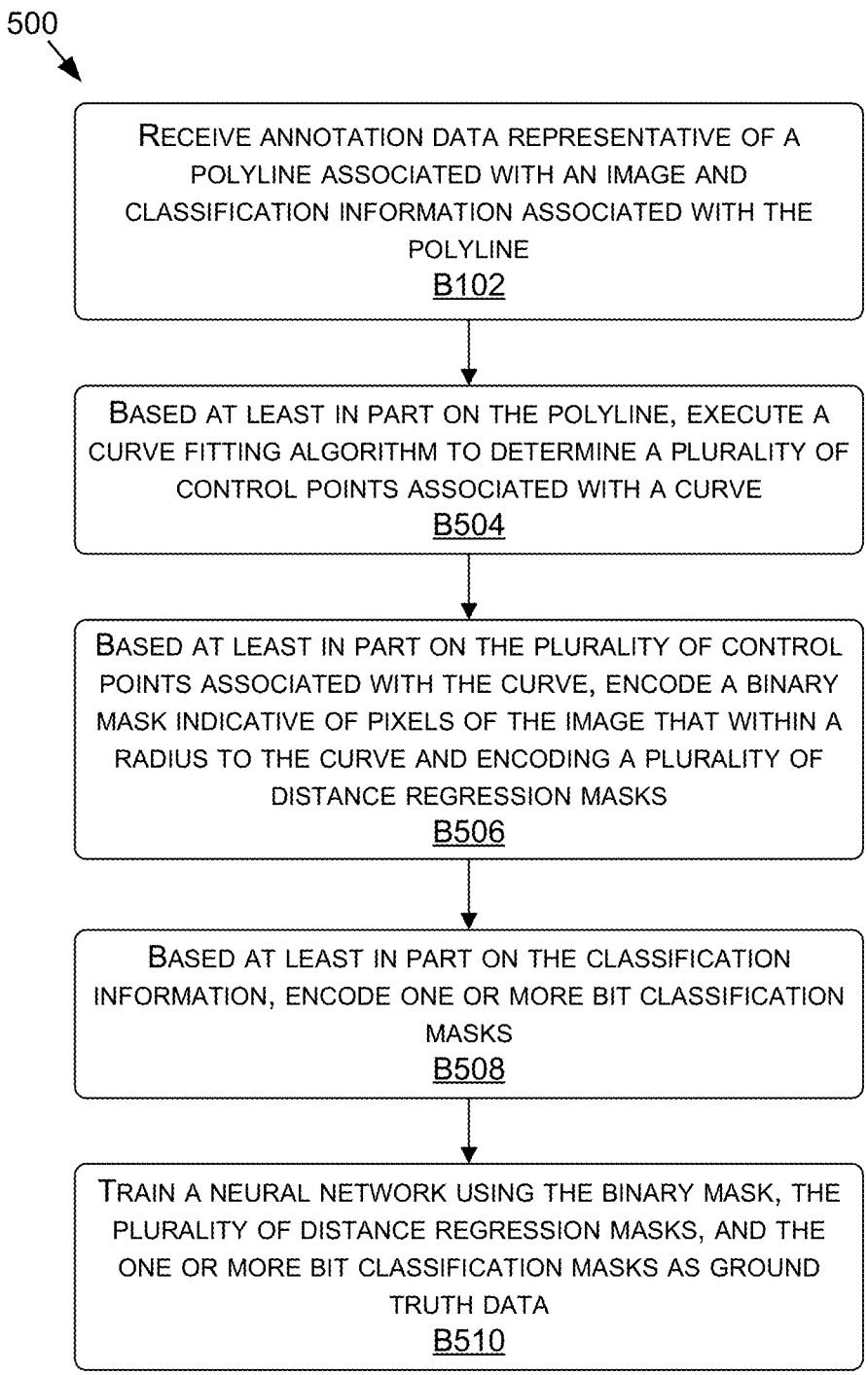
FIG. 5 is a flow diagram showing a method for training a DNN for landmark detection, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few. In addition, method 500 is described, by way of example, with respect to the process 100 of FIG. 1. However, this method 500 may additionally or alternatively be executed by any one process and within any one system, or any combination of processes and systems, including, but not limited to, those described herein.

FIG. 5 is a flow diagram showing a method 500 for training a DNN 104 for landmark detection, in accordance with some embodiments of the present disclosure. The method 500, at block B502, includes receiving annotation data representative of a polyline associated with an image and classification information associated with the polyline. For example, the annotation data 114 associated with an instance of the sensor data 102 may be received and/or generated, and the annotation data may represent one or more polylines corresponding to landmarks and/or classification information associated therewith.

The method 500, at block B504, includes, based at least in part on the polyline, executing a curve fitting algorithm to determine a plurality of control points associated with a curve. For example, the curve fitter 116 may execute a curve fitting operation using the annotation data 114 to determine control points corresponding to a curve.

The method 500, at block B506, includes, based at least in part on the plurality of control points associated with the curve, encoding a binary mask indicative of pixels of the image that within a radius to the curve and encoding a plurality of distance regression masks. For example, using the control points 118 and/or the curve information, the encoder 120 may encode the GT binary mask(s) 124 and/or the GT distance regression mask(s) 126, where each distance regression mask may be indicative of distances to a control point 118 of the plurality of control points 118.

The method 500, at block B508, includes, based at least in part on the classification information, encoding one or more bit classification masks. For example, the encoder 120 may encode the GT bit classification mask(s) 128 using the classification information and/or the control point or curve information.

The method 500, at block B510, includes training a neural network using the binary mask, the plurality of distance regression masks, and the one or more bit classification masks as ground truth data. For example, the training engine 130 may use the ground truth data 122 to train the DNN(s) 104 to compute the outputs 106.

DNN for Landmark Detection

Figure 6:
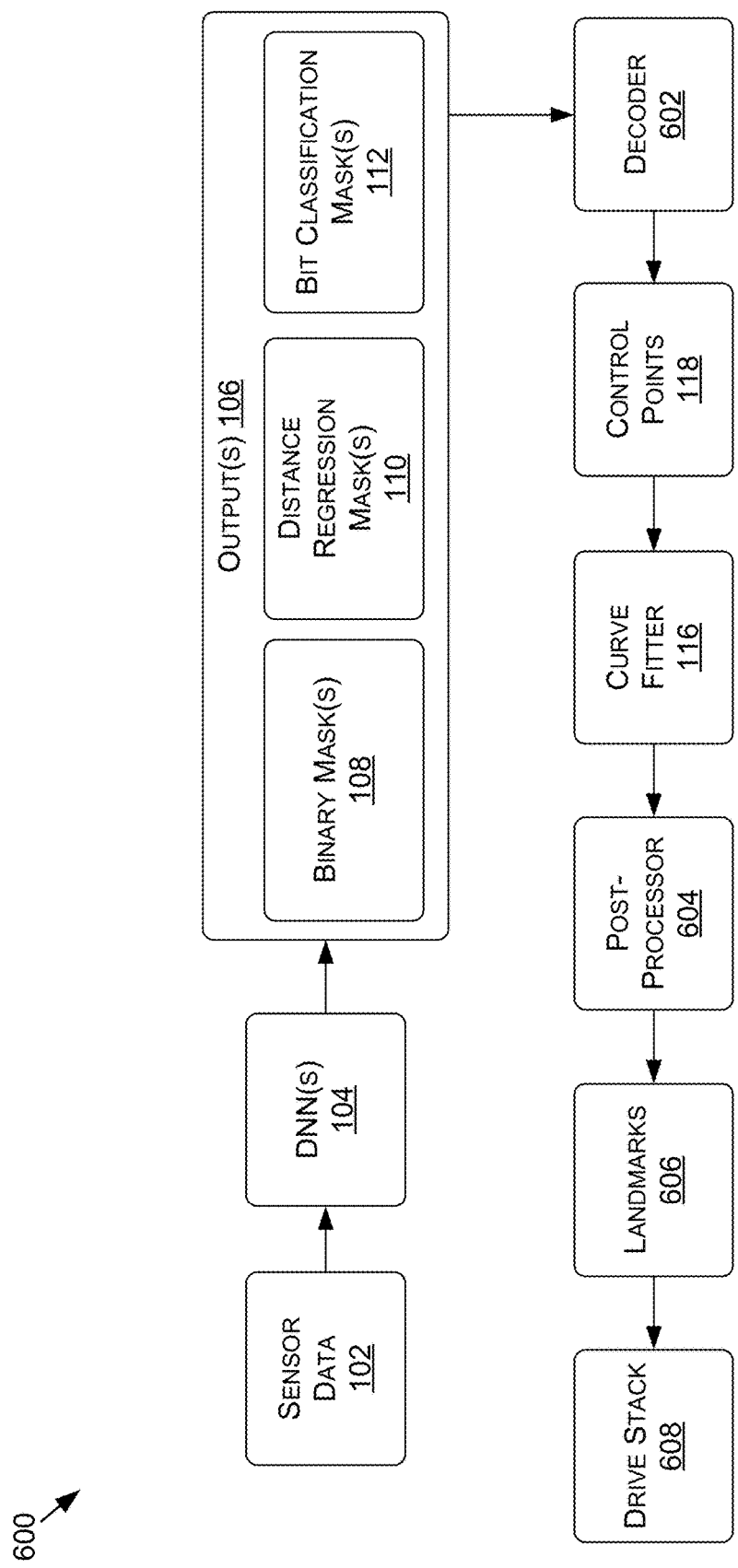
FIG. 6 is a data flow diagram illustrating an example process of using a DNN for landmark detection, in accordance with some embodiments of the present disclosure.

Now referring to FIG. 6, FIG. 6 is a data flow diagram illustrating an example process 600 of using a DNN for landmark detection, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, deployment of the DNN(s) 104 according to the process 600 may be implemented, at least in part, using similar components, features, and/or functionality as described herein with respect to vehicle 1100 of FIGS. 11A-11D, example computing device 1200 of FIG. 12, and/or example data center 1300 of FIG. 13.

The process 600 may include generating and/or receiving sensor data 102 generated by one or more sensors of the vehicle 1100. The sensor data 102 may be similar to that described herein, such as with respect to the process 100 of FIG. 1. The sensor data 102 may be applied to the DNN(s) 104—which may be trained according to the process 100 of FIG. 1—and the DNN(s) 104 may compute the outputs 106. The DNN(s) 104 may include a convolutional neural network (CNN), in embodiments. Although examples are described herein with respect to using neural networks, and specifically convolutional neural networks, as the DNN(s) 104, this is not intended to be limiting. For example, and without limitation, the DNN(s) 104 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

As an example, such as where the DNN(s) 104 include a CNN, the DNN(s) 104 may include any number of layers. One or more of the layers may include an input layer. The input layer may hold values associated with the sensor data 102 (e.g., before or after post-processing). For example, when the sensor data 102 is an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more layers may include deconvolutional layers (or transposed convolutional layers). For example, a result of the deconvolutional layers may be another volume, with a higher dimensionality than the input dimensionality of data received at the deconvolutional layer.

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1× number of classes. In some examples, the CNN may include a fully connected layer(s) such that the output of one or more of the layers of the CNN may be provided as input to a fully connected layer(s) of the CNN. In some examples, one or more convolutional streams may be implemented by the DNN(s) 104, and some or all of the convolutional streams may include a respective fully connected layer(s).

In some non-limiting embodiments, the DNN(s) 104 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the DNN(s) 104, this is not intended to be limiting. For example, additional or alternative layers may be used in the DNN(s) 104, such as normalization layers, SoftMax layers, and/or other layer types.

In embodiments where the DNN(s) 104 includes a CNN, different orders and numbers of the layers of the CNN may be used depending on the embodiment. In other words, the order and number of layers of the DNN(s) 104 is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the DNN(s) 104 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Figure 8A:
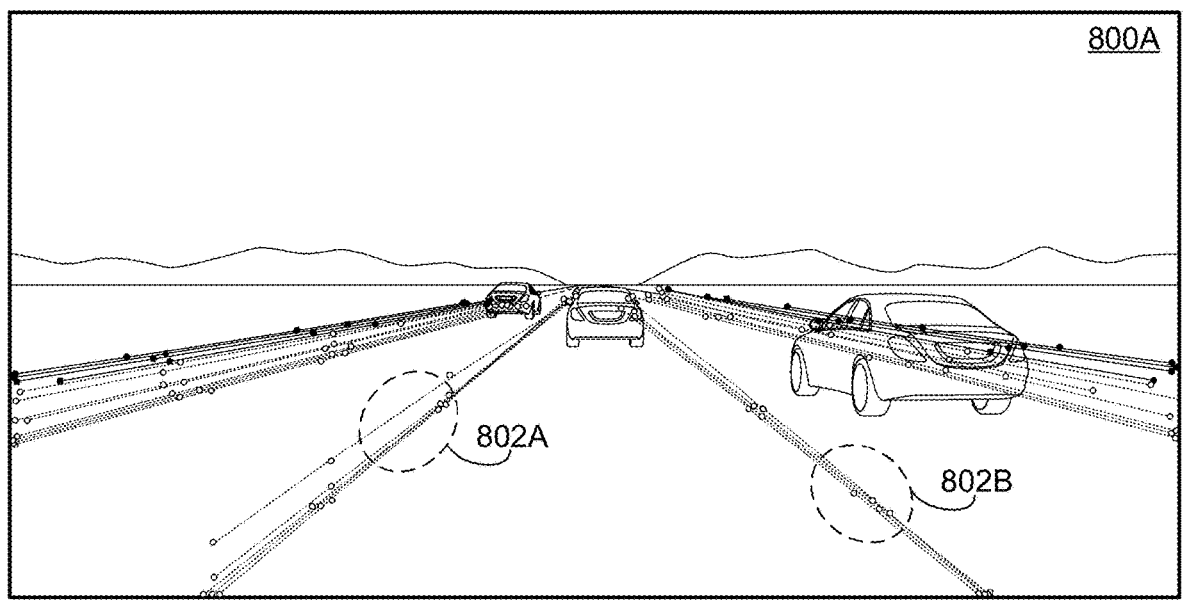
FIGS. 8A-8B depict visualizations of predicted curves before and after post-processing, in accordance with some embodiments of the present disclosure.
Figure 8B:
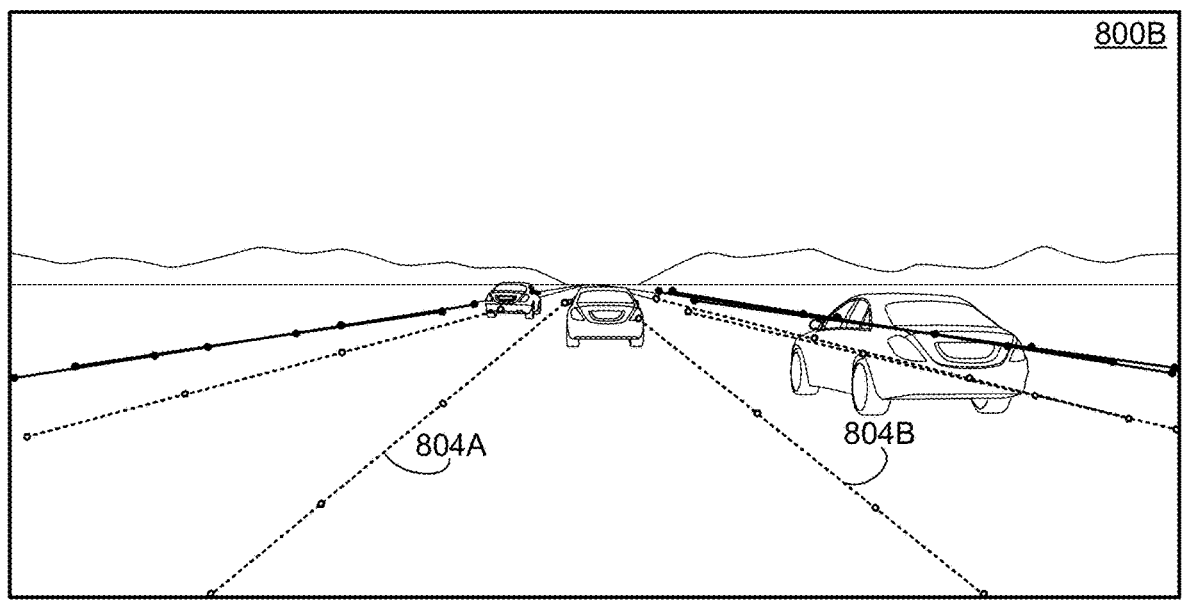

The outputs 106 may be decoded using the decoder 602 to determine the control points 118. For example, each pixel classified as positive (or within a radius of a curve) from the binary mask(s) 108 may be considered a candidate pixel (e.g., for 2D predictions) or point (e.g., for 3D predictions). The corresponding values for the same pixel in the distance regression mask(s) 110 and the bit classification mask(s) 112 may be used as the properties for a curve candidate (e.g., a Bezier curve candidate). For example, for a pixel of the binary mask that is a positive pixel (e.g., a white pixel, or a pixel identified as within the radius of a curve), the x-distance values from one or more (e.g., all) of the x-axis distance regression masks 110 and the y-distance values from one or more (e.g., all) of the y-axis distance regression masks 110 may be used to determine candidate control point locations. This process may be repeated for each of the candidate pixels. Ultimately, for each landmark depicted in an image, there may be numerous overlapping or similar control points and curves, as illustrated in FIG. 8A. For example, for a single landmark—e.g., lane line—there may be multiple sets of control points 118. The curve fitter 116 may use each set of control points 118 to execute a curve fitting operation to generate the curves (e.g., Bezier curves).

Due to the potential for a plurality of curves being generated for a same landmark, various post-processing operations may be executed using the post-processor 604 to determine final curves for use by the vehicle 1100—e.g., by an autonomous driving software stack (or drive stack) 608. For example, clustering may be executed by the post-processor 604 using any clustering algorithm type. In a non-limiting embodiment, a density-based spatial clustering of applications with noise (DBSCAN) algorithm may be executed for the curve candidates, while in another non-limiting embodiment a probabilistic voting algorithm may be used. In any example, a similarity function may be used within the clustering algorithm. The similarity function, in some embodiments, may include an integral loss similarity function. For example, equation (7), below, may represent an example of the integral loss similarity function.

$$\int_0^1 \|P_1(t) - P_2(t)\|_2^2 dt = \frac{1}{7}(a_1 - a_2)^2 + \tag{7}$$

$$\frac{1}{6}[2(a_1 - a_2)(b_1 - b_2)] + \frac{1}{5}[(b_1 - b_2)^2 + 2(a_1 - a_2)(c_1 - c_2)] +$$

$$\frac{1}{4}[2(a_1 - a_2)(d_1 - d_2) + 2(b_1 - b_2)(c_1 - c_2)] +$$

$$\frac{1}{3}[(c_1 - c_2)^2 + 2(b_1 - b_2)(d_1 - d_2)] +$$

$$\frac{1}{2}[2(c_1 - c_2)(d_1 - d_2)] + (d_1 - d_2)^2$$

In equation (7), $P_1$ and $P_2$ are points on two (Bezier) curves that are being compared, t is a parameter of the curves that moves from 0 to 1, $a_1$ and $a_2$ are cubic coefficients of the first and second curve, respectively, $b_1$ and $b_2$ are quadratic coefficients of the first and second curve, respectively, $c_1$ and $c_2$ are linear coefficients of the first and second curve, respectively, and $d_1$ and $d_2$ are constant term coefficients of the first curve and the second curve, respectively. As such, $P_1(t)=a_1*t^3+b_1*t^2+c_1*t+d_1$ (0<=t<=1) and $P_2(t)=a_2*t^3+b_2*t^2+c_2*t+d_2$ (0<=t<=1) may correspond to the formula of the points on the two Bezier curves, respectively. After clustering, there should be a single curve for each landmark feature. However, in some instances, there may still be two or more curves for one or more of the landmark features. In such examples, another post-processing technique of duplication removal may be executed by the post-processor 604. For example, curves may be compared to other curves that are close to one another (e.g., within some threshold distance from one another), and these curve with lower confidence may be removed. As such, based on the predictions of the DNN(s) 104 and/or the clustering, each of the curves may have a confidence associated therewith, and the curve with the lowest confidence may be removed.

As an example, and with respect to FIG. 8A, the decoded outputs 106 of the DNN(s) 104 may be represented in visualization 800A. As illustrated, a plurality of candidate curves 802 may be generated for each landmark type—e.g., lane lines or road boundary lines in the illustration of FIG. 8A. As such, post-processing may be executed to generate final curves 804 that include one final curve 804 per landmark feature. For example, candidate curves 802A may undergo post-processing to generate the final curve 804A, candidate curves 802B may undergo post-processing to generate the final curve 804B, and so on. These final curves 804 may be associated with landmarks 606, such that the location, orientation, pose, and/or other information about the landmarks may be known.

Figure 7:
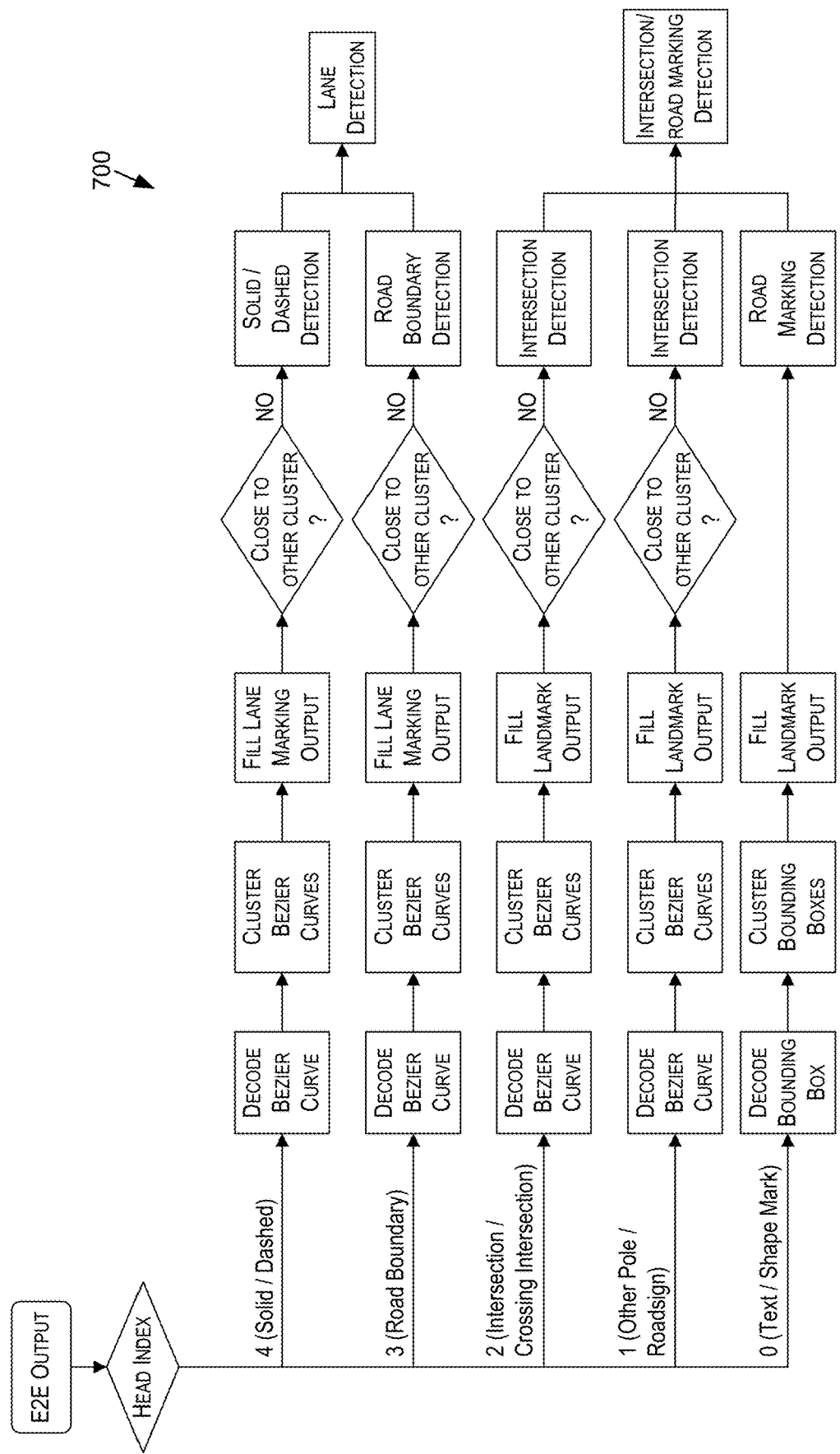
FIG. 7 is a data flow diagram illustrating an example process of decoding and post-processing outputs of a DNN for landmark detection, in accordance with some embodiments of the present disclosure.

With reference to FIG. 7, FIG. 7 is a data flow diagram illustrating an example process 700 of decoding and post-processing outputs of a DNN 104 for landmark detection, in accordance with some embodiments of the present disclosure. For example, the process 700 may include an end-to-end (E2E) process for landmark detection. Various classes of landmarks 606 may be used together to determine final information, such as lane detection, intersection detection, road marking detection, and so on. As such, to determine solid/dashed lines (or lane lines), the outputs 106 may be decoded to generate the candidate curves, the candidate curves may be clustered to generate final curves (e.g., to fill a lane marking output), and where the final curve is close to another final curve duplication removal may be performed to result in a solid/dashed line (or lane line) detection. A similar process may be executed for road boundary lines, and the combination of the lane lines and road boundary lines may be used to identify each of the lanes of the driving surface—e.g., to generate a lane graph. As another example, similar processes may be executed for intersections or crossing intersections (e.g., crosswalks, pedestrian walkways, etc.), poles or signs, and/or text or other shapes identified using the DNN(s) 104. These outputs—e.g., intersection detection using intersection lines, intersection detection using poles or road signs, and road marking detection—may be used to determine intersection locations, structures, and poses, and/or to determine road marking information. As such, even where separate classes of information are computed by the DNN(s) 104, one or more classes of detected curves may be used to determine a final output—e.g., lane graph, intersection structure, etc.—that may be used by the vehicle 1100, such as by the drive stack 608.

Figure 9A:
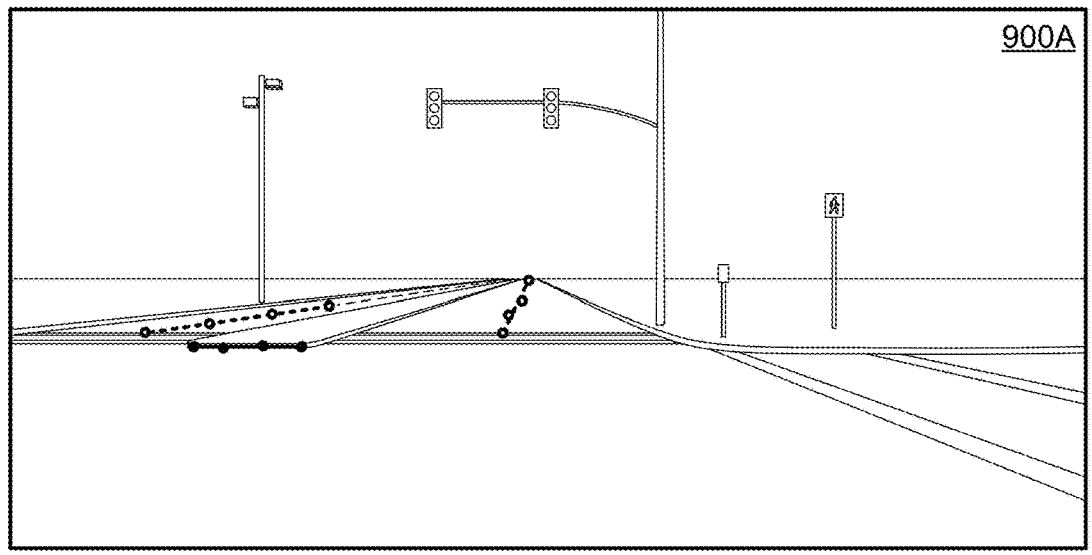
FIGS. 9A-9D depict visualizations of example landmark types detected using a DNN, in accordance with some embodiments of the present disclosure.
Figure 9B:
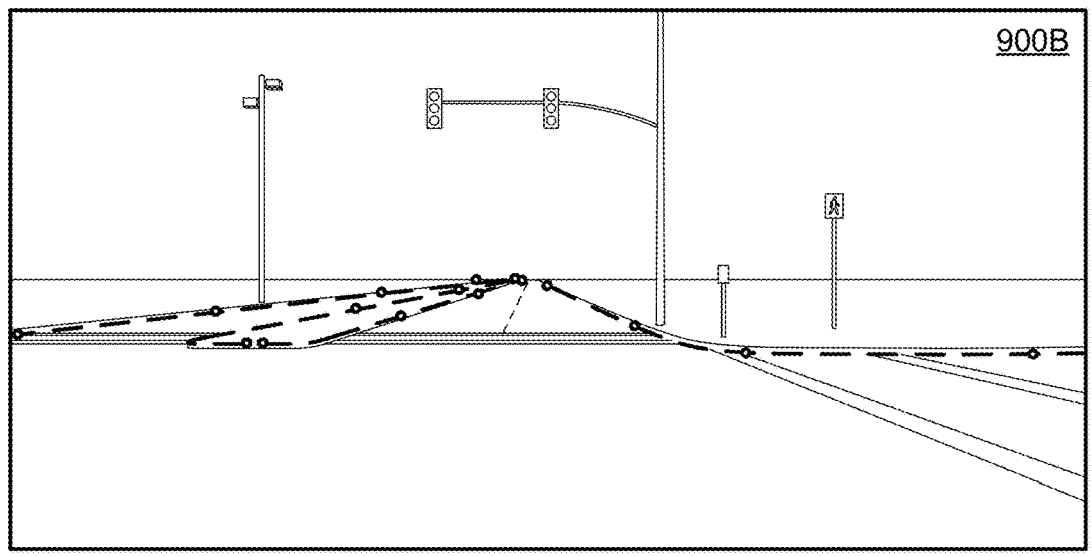
Figure 9C:
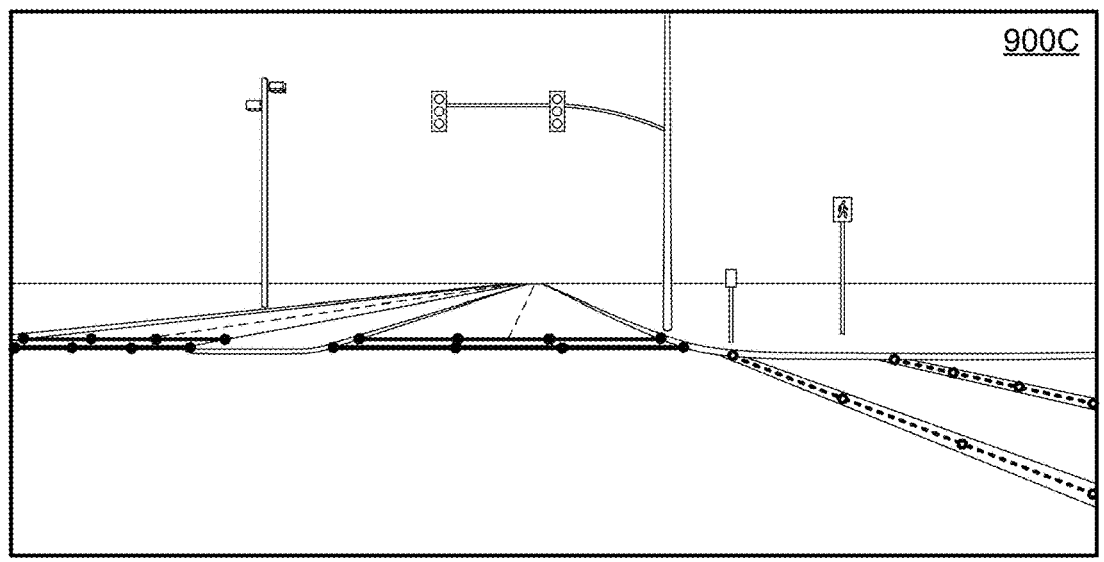
Figure 9D:
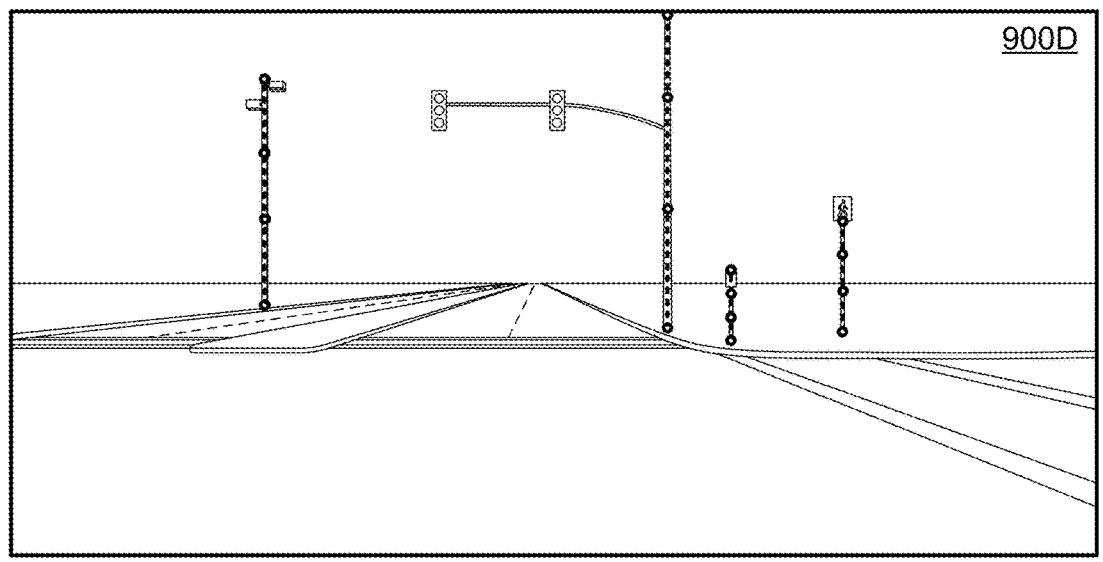

With reference again to FIG. 1, the landmarks 606 may include any types of landmarks, such as, but not limited to, road markings, lane lines, road boundary lines, intersection lines, pedestrian walkways, bike lane lines, text, poles, trees, light posts, or signs. As described herein, the various classes may include any number of sub-classes that the DNN(s) 104 is trained to predict. As examples of landmarks 606, FIG. 9A includes a visualization 900A of curves fit to lane lines, FIG. 9B includes a visualization 900B of curves fit to road boundary lines, FIG. 9C includes a visualization 900C of curves fit to intersection lines, and FIG. 9D includes a visualization of curves fit to poles and signs.

Figure 10:
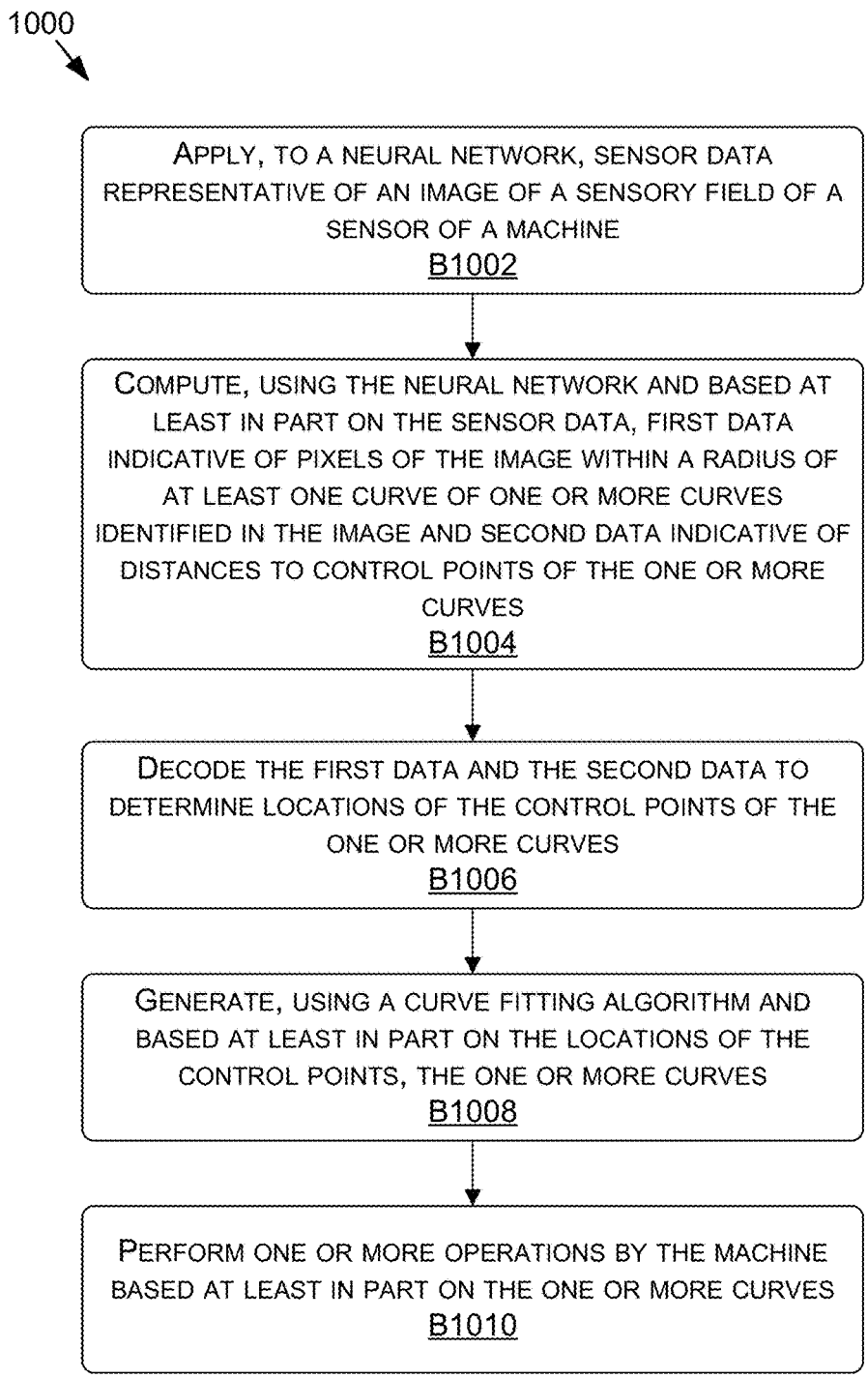
FIG. 10 is a flow diagram showing a method for landmark detection using a DNN, in accordance with some embodiments of the present disclosure.

Now referring to FIG. 10, each block of method 1000, described herein, comprises a computing process that may be performed using any combination of hardware, firmware, and/or software. For instance, various functions may be carried out by a processor executing instructions stored in memory. The method 1000 may also be embodied as computer-usable instructions stored on computer storage media. The method 1000 may be provided by a standalone application, a service or hosted service (standalone or in combination with another hosted service), or a plug-in to another product, to name a few. In addition, method 1000 is described, by way of example, with respect to the process 600 of FIG. 6 and the vehicle 1100 of FIGS. 11A-11D. However, this method 1000 may additionally or alternatively be executed by any one process and within any one system, or any combination of processes and systems, including, but not limited to, those described herein.

FIG. 10 is a flow diagram showing a method 1000 for landmark detection using a DNN, in accordance with some embodiments of the present disclosure. The method 1000, at block B1002, includes applying, to a neural network, sensor data representative of an image of a sensory field of a sensor of a machine. For example, an instance of the sensor data 102 may be applied to the DNN(s) 104.

The method 1000, at block B1004, includes computing, using the neural network and based at least in part on the sensor data, first data indicative of pixels of the image within a radius of at least one curve of one or more curves identified in the image and second data indicative of distances to control points of the one or more curves. For example, the DNN(s) 104 may compute the binary mask(s) 108 and the distance regression mask(s) 110 based at least in part on processing the instance of the sensor data 102.

The method 1000, at block B1006, includes decoding the first data and the second data to determine locations of the control points of the one or more curves. For example, the binary mask(s) 108 and the distance regression mask(s) 110 may be decoded using the decoder 602 to determine locations—e.g., in 2D image space or 3D world space—of the control points 118.

The method 1000, at block B1008, includes generating, using a curve fitting algorithm and based at least in part on the locations of the control points, the one or more curves. For example, the curve fitter 116 may use the control points 118 to determine the shape of the curves corresponding to landmarks in the environment.

The method 1000, at block B1010, includes performing one or more operations by the machine based at least in part on the one or more curves. For example, the vehicle 1000 may use the curves (and/or the semantic information corresponding thereto) to perform one or more operations, such as world model management, mapping, planning, control, etc.

Example Autonomous Vehicle

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. For example, the vehicle 1100 may be capable of conditional automation (Level 3), high automation (Level 4), and/or full automation (Level 5), depending on the embodiment.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the HD map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over LTE, WCDMA, UMTS, GSM, CDMA2000, etc. The wireless antenna(s) 1126 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LP-WANs), such as LoRaWAN, SigFox, etc.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may be any number of wide-view cameras 1170 on the vehicle 1100. In addition, long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

One or more stereo cameras 1168 may also be included in a front-facing configuration. The stereo camera(s) 1168 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA).

The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and afield of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example.

In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
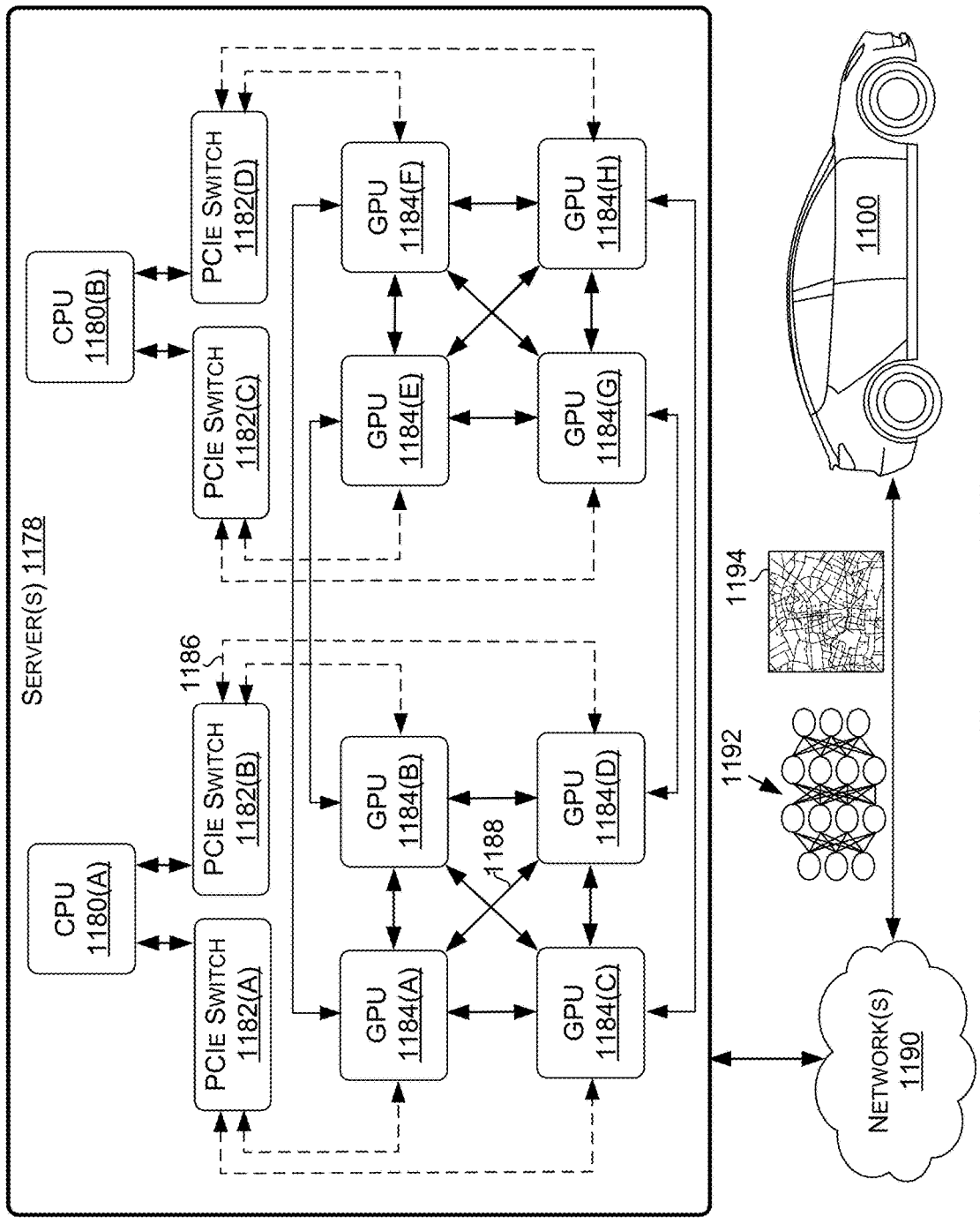
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s)

1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
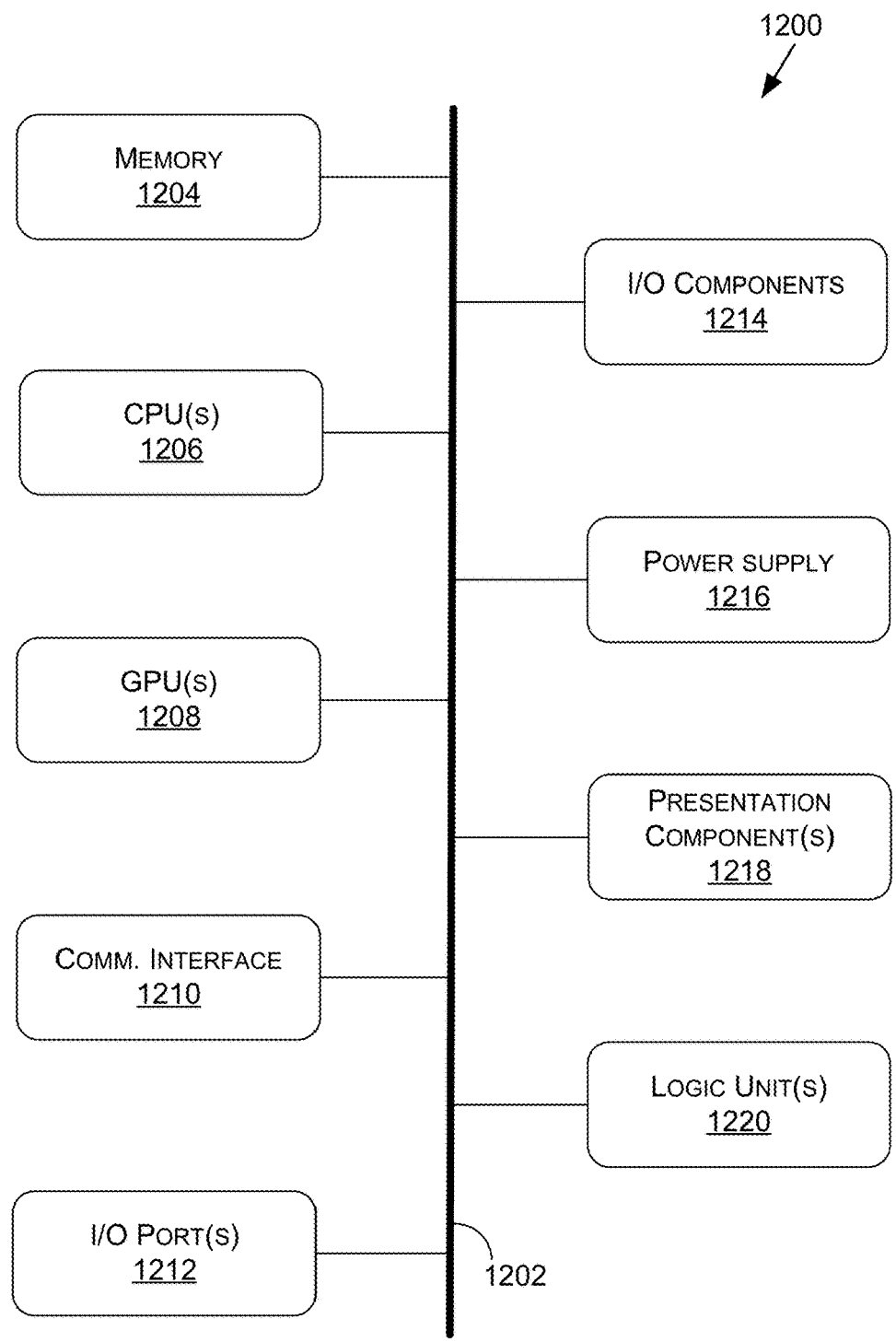
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, etc.), and output the data (e.g., as an image, video, sound, etc.).

Example Data Center

Figure 13:
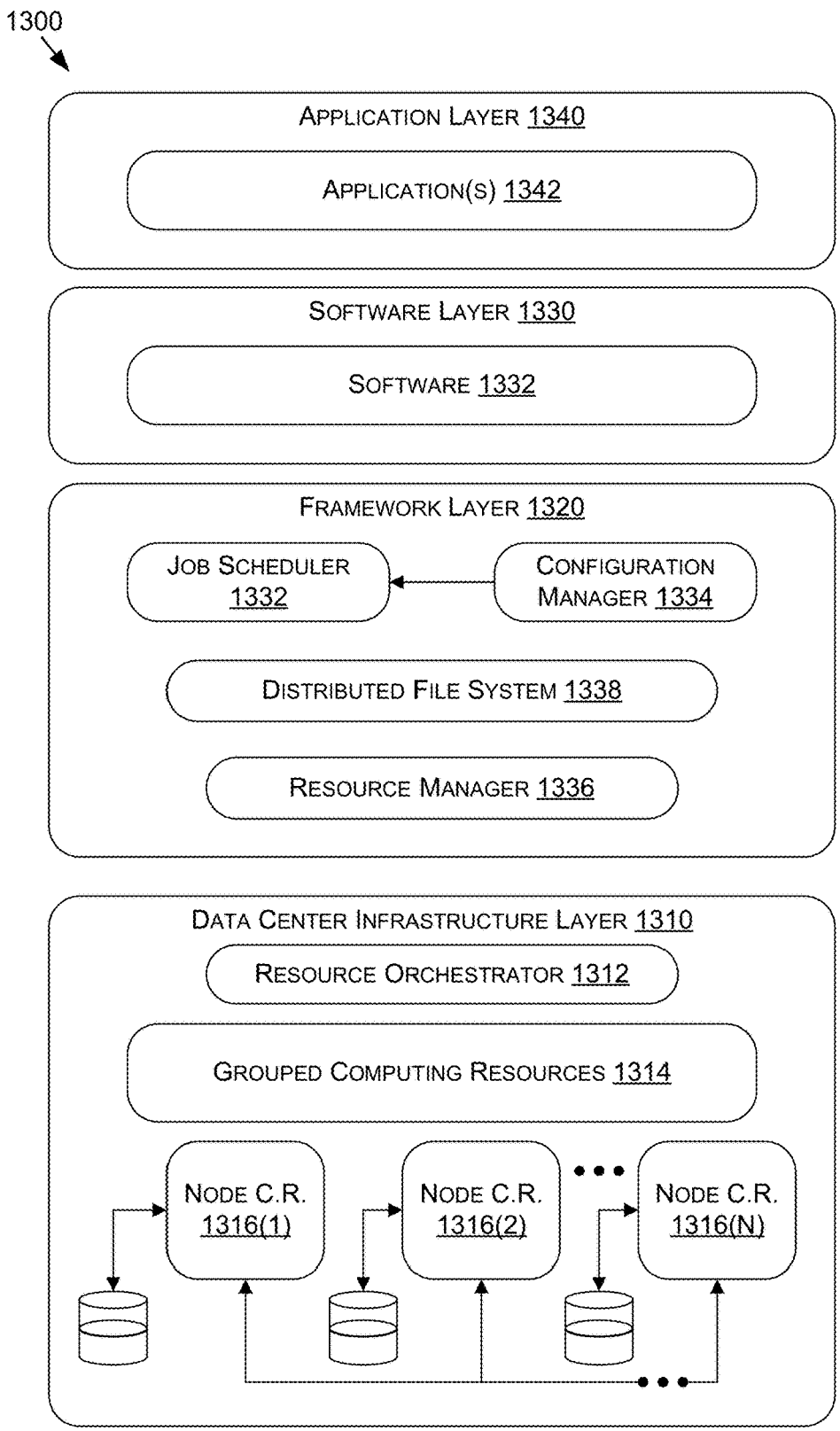
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161(N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1322 may configure or otherwise control one or more node C.R.s 1316(1)-1316(N) and/or grouped computing resources 1314. In at least one embodiment, resource orchestrator 1322 may include a software design infrastructure ("SDI") management entity for the data center 1300. The resource orchestrator 1322 may include hardware, software, or some combination thereof.

In at least one embodiment, as shown in FIG. 13, framework layer 1320 may include a job scheduler 1332, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1332 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1332. In at least one embodiment, clustered or grouped computing resources may include grouped computing resource 1314 at data center infrastructure layer 1310. The resource manager 1036 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316(1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
computing, using a neural network and based at least on sensor data representative of a sensory field of a sensor:
one or more locations of one or more control points of one or more curves identified in an image represented by the sensor data; and
classification information for the one or more curves;
generating, using a curve fitting algorithm and based at least on the one or more locations of the one or more control points, the one or more curves;
associating the classification information with the one or more curves; and
performing one or more operations by a machine based at least on the one or more curves and the classification information.

2. The method of claim 1, wherein the computing the one or more locations of the one or more control points comprises:
computing, using the neural network, first data indicative of one or more pixels of the image within a radius of at least one curve of the one or more curves identified in the image;

computing second data indicative of one or more distances to the one or more control points of the one or more curves; and decoding the first data and the one or more second data to determine the one or more locations of the one or more control points.

3. The method of claim 1, wherein the classification information is representative of one or more bit classification masks.

4. The method of claim 3, wherein a number of bit classification masks of the one or more bit classification masks is equal to one less than a number of classification types that the neural network computes outputs for.

5. The method of claim 2, wherein the first data is representative of a binary mask where the one or more pixels of the image within the radius of the at least one curve of the one or more curves depicted in the image have a first value, and one or more other pixels other than the one or more pixels have a second value different than the first value.

6. The method of claim 2, wherein at least one individual curve includes a number of control points greater than three, the second data is representative of a plurality of regression masks, and the plurality of regression masks include a number of x-axis distance regression masks and y-axis distance regression masks equal to the number of control points.

7. The method of claim 1, wherein the curve fitting algorithm includes at least one of a two-dimensional Bezier curve fitting algorithm, a three-dimensional Bezier curve fitting algorithm, a cubic Bezier curve fitting algorithm, a higher order Bezier curve fitting algorithm, or a split wise Bezier curve fitting algorithm.

8. The method of claim 1, further comprising:
executing a clustering algorithm on the one or more curves to generate a final set of curves,
wherein the performing the one or more operations is based at least on the final set of curves and the classification information.

9. The method of claim 8, wherein the clustering algorithm includes a density-based spatial clustering of application with noise (DBSCAN) operation that uses integral loss as a similarity function.

10. The method of claim 1, wherein the one or more curves correspond to one or more of road markings, lane lines, road boundary lines, intersection lines, pedestrian walkways, bike lane lines, text, poles, trees, light posts, or signs.

11. A system comprising:
one or more processing units to:
compute, using a neural network and based at least on sensor data representative of an image corresponding to a sensory field of a sensor:
one or more locations of one or more control points of one or more curves corresponding to one or more features identified in the image; and
classification information for the one or more curves;
generate, using a curve fitting algorithm and based at least on the one or more locations of the one or more control points, the one or more curves;
associate the classification information with the one or more curves; and
perform one or more operations based at least on the one or more curves and the classification information.

12. The system of claim 11, wherein the computation of the one or more locations of the one or more control points comprises:
computing a binary mask indicative of one or more pixels of the image within a radius of at least one curve of the one or more curves corresponding to the one or more features identified in the image;
computing one or more distance regression maps indicative of one or more distances to the one or more control points of the one or more curves; and
decoding the binary mask and the one or more distance regression maps to determine the one or more locations of the one or more control points.

13. The system of claim 11, wherein the computation of the classification information for the one or more curves comprises computing, using the neural network and based at least on the sensor data, one or more bit classification masks indicative of the classification information for the one or more curves.

14. The system of claim 13, wherein a number of bit classification masks of the one or more bit classification masks is equal to one less than a number of classification types that the neural network computes outputs for.

15. The system of claim 12, wherein an individual curve includes a number of control points, and the one or more distance regression masks include a number of x-axis distance regression masks and y-axis distance regression masks equal to the number of control points.

16. The system of claim 11, wherein the curve fitting algorithm includes at least one of a two-dimensional Bezier curve fitting algorithm, a three-dimensional Bezier curve fitting algorithm, a cubic Bezier curve fitting algorithm, a higher order Bezier curve fitting algorithm, or a split wise Bezier curve fitting algorithm.

17. The system of claim 11, wherein the one or more processing units are further to:
execute a clustering algorithm on the one or more curves to generate a final set of curves,
wherein the performance of the one or more operations is based at least on the final set of curves and the classification information.

18. The system of claim 11, wherein the system comprises at least one of:
a system for performing simulation operations;
a system for performing simulation operations to test or validate autonomous machine applications;
a system for performing deep learning operations;
a system implemented using an edge device;
a system incorporating one or more Virtual Machines (VMs);
a system implemented at least partially in a data center; or
a system implemented at least partially using cloud computing resources.

19. A method comprising:
receiving annotation data representative of a polyline associated with an image and classification information associated with the polyline;
based at least on the polyline, executing a curve fitting algorithm to determine a plurality of control points associated with a curve;
based at least on the plurality of control points associated with the curve:
encoding a binary mask indicative of pixels of the image that are within a radius to the curve; and encoding a plurality of distance regression masks, an individual distance regression mask indicative of one or more distances to a control point of the plurality of control points;

based at least on the classification information, encoding one or more bit classification masks; and updating one or more parameters of a neural network using the binary mask, the plurality of distance regression masks, and the one or more bit classification masks as ground truth data.

20. The method of claim 19, further comprising cropping at least one of a top portion or a bottom portion of the polyline to generate a cropped polyline, wherein the executing the curve fitting algorithm is based at least on the cropped polyline.

21. The method of claim 19, further comprising:

receiving initial annotation data representative of a polygon; and extracting, based at least on the initial annotation data, the polyline as one of a left edge, a right edge, or a center rail of the polygon to generate the annotation data.

22. The method of claim 19, wherein the one or more parameters of the neural network are updated using one or more of integral loss, binary cross entropy loss, masked L1 loss, or masked binary cross entropy loss.

23. The method of claim 19, wherein the encoding the plurality of distance regression maps includes, for the control point of the plurality of control points, encoding an x-axis distance regression map and a y-axis distance regression map.

24. The method of claim 19, wherein the neural network is trained to predict a number, n, of classification types, and the encoding the one or more bit classification masks including encoding n-1 bit classification masks.

25. The method of claim 19, wherein the curve fitting algorithm includes at least one of a two-dimensional Bezier curve fitting algorithm, a three-dimensional Bezier curve fitting algorithm, a cubic Bezier curve fitting algorithm, a higher order Bezier curve fitting algorithm, or a split wise Bezier curve fitting algorithm.

26. The system of claim 11, wherein the classification information indicates one or more of road markings, lane lines, road boundary lines, intersection lines, pedestrian walkways, bike lane lines, text, poles, trees, light posts, or signs.

* * * * *